(12) United States Patent
Jin et al.

(10) Patent No.: US 9,918,119 B2
(45) Date of Patent: Mar. 13, 2018

(54) PRESCHEDULING RECORDINGS OF MEDIA CONTENT

(71) Applicant: Verizon Patent and Licensing Inc., Arlington, VA (US)

(72) Inventors: Zhiying Jin, Lexington, MA (US); Ruishuang Wang, Acton, MA (US); Samuel Thomas Scott, III, Saratoga, CA (US); Johannes P. Schmidt, Los Altos Hills, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 115 days.

(21) Appl. No.: 14/755,749

(22) Filed: Jun. 30, 2015

(65) Prior Publication Data
US 2017/0006333 A1    Jan. 5, 2017

(51) Int. Cl.
| H04N 5/76 | (2006.01) |
| H04N 5/765 | (2006.01) |
| H04N 9/80 | (2006.01) |
| H04N 21/433 | (2011.01) |
| H04N 21/25 | (2011.01) |
| H04N 21/258 | (2011.01) |
| H04N 21/4227 | (2011.01) |
| H04N 21/6543 | (2011.01) |

(52) U.S. Cl.
CPC ....... H04N 21/4334 (2013.01); H04N 21/252 (2013.01); H04N 21/25891 (2013.01); H04N 21/4227 (2013.01); H04N 21/6543 (2013.01)

(58) Field of Classification Search
USPC ................................. 386/239–248, 291–299
See application file for complete search history.

(56) References Cited

U.S. PATENT DOCUMENTS

| 2005/0196139 A1* | 9/2005 | Blackketter ........ H04N 5/44513 386/296 |
| 2008/0170836 A1* | 7/2008 | Kinoshita .............. H04N 5/765 386/291 |
| 2009/0060469 A1* | 3/2009 | Olague .............. H04N 7/17318 386/297 |
| 2011/0016492 A1* | 1/2011 | Morita ............... H04N 5/44543 725/58 |
| 2011/0052156 A1* | 3/2011 | Kuhn ..................... G11B 27/34 386/295 |
| 2011/0311206 A1* | 12/2011 | Hubner .................. H04N 5/765 386/297 |
| 2013/0268957 A1* | 10/2013 | Ly ..................... H04N 21/4334 725/13 |

(Continued)

OTHER PUBLICATIONS

Tivo, "Get Suggestions," https://www.tivo.com/my-account/how-to/get-suggestions, Oct. 31, 2013, 1 page.

*Primary Examiner* — Hung Dang

(57) ABSTRACT

A device may determine media content to be prescheduled for recording without receiving a request to record the media content and based on a quantity of users expected to record the media content. The device may determine a digital video recorder (DVR) device, for which the media content is to be prescheduled for recording, without receiving a user request to record the media content using the DVR device. The device may provide an instruction to cause the DVR device to record the media content.

20 Claims, 19 Drawing Sheets

(56) References Cited

U.S. PATENT DOCUMENTS

2013/0302016 A1* 11/2013 Howarter ................ H04N 5/76
386/252
2016/0142761 A1* 5/2016 Govinde ............ H04N 21/4334
386/296

* cited by examiner

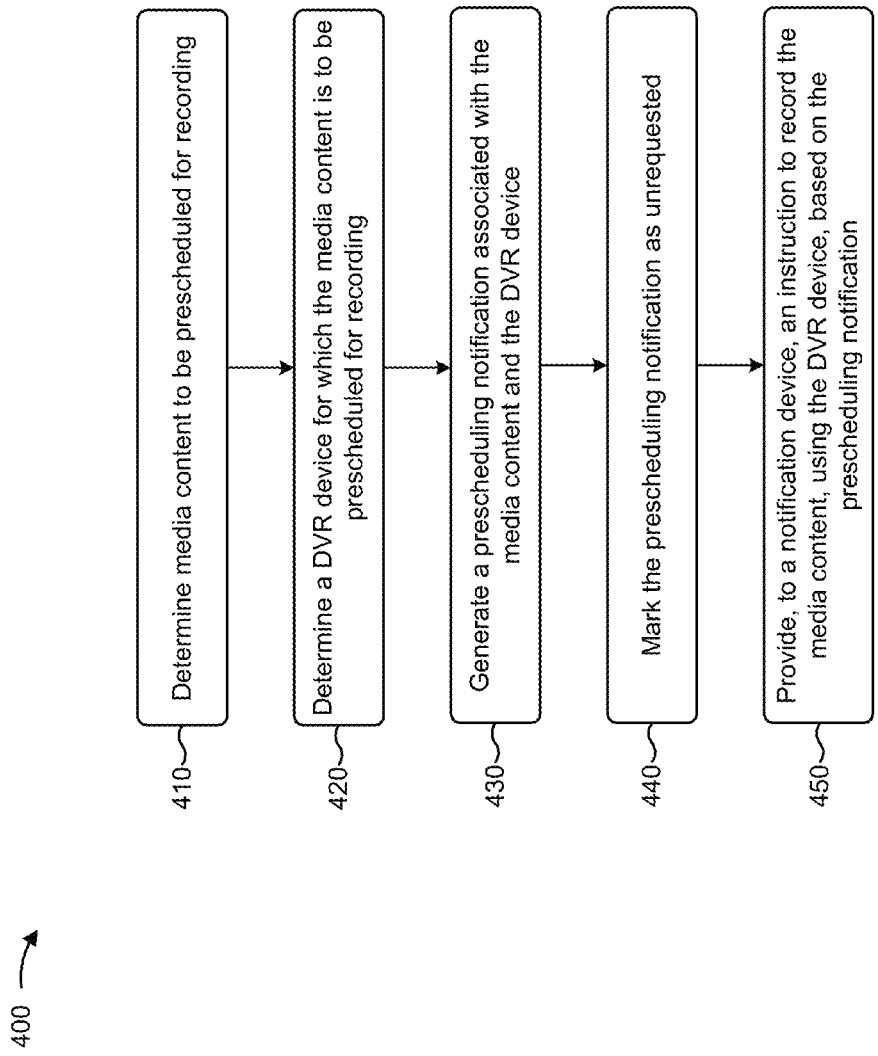

US 9,918,119 B2

PRESCHEDULING RECORDINGS OF MEDIA CONTENT

BACKGROUND

A digital video recorder (DVR) may refer to a device or application software that records video in a digital format to a disk drive, universal serial bus (USB) flash drive, Secure Digital (SD) memory card, or other local or networked storage device. For example, a DVR may include a set-top box, a portable media player, and/or software executing on a personal computer that enables video capture and playback to and from a storage device.

BRIEF DESCRIPTION OF THE DRAWINGS

FIG. 4 is a flow chart of an example process for prescheduling media content for recording;

DETAILED DESCRIPTION OF PREFERRED EMBODIMENTS

The following detailed description of example implementations refers to the accompanying drawings. The same reference numbers in different drawings may identify the same or similar elements.

In some systems, such as an Internet Protocol television (IPTV) system, a DVR device that records media content may be controlled by a remote device, such as a server, rather than a local device, such as a set-top box or a remote control. In this case, requests to record media content may be provided to the DVR device over a network, rather than being provided locally via the set-top box or the remote control. In some instances, many users may provide requests to record media content (e.g., the Super Bowl) at or around the same time. In these instances, the volume of requests may be burdensome to the network or the system, and may prevent a recording from occurring or may delay a recording. Implementations described herein may assist with more effectively managing requests to record media content without overburdening the system, preventing a recording from occurring, or delaying a recording.

Figure 1A:
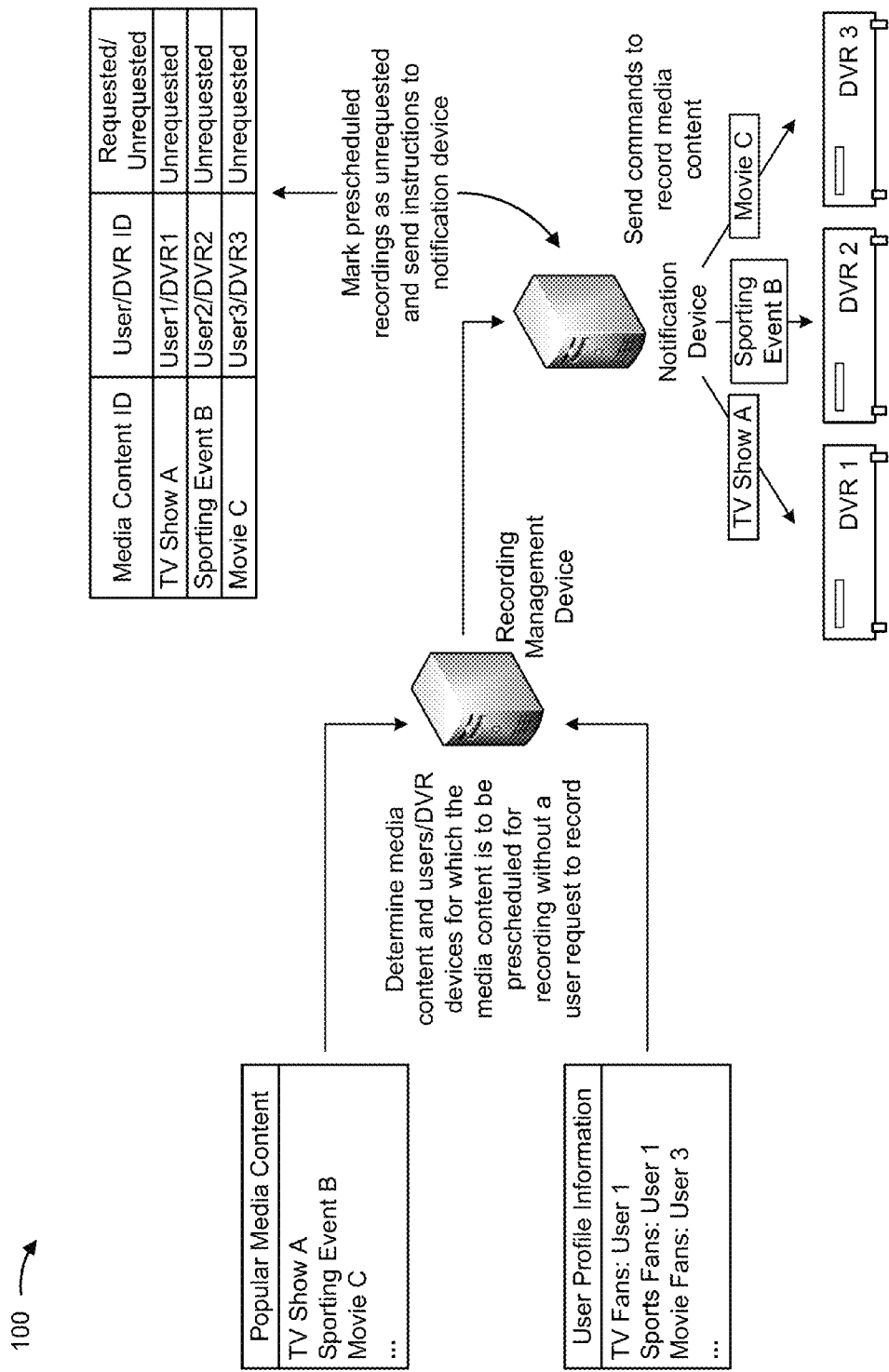
FIGS. 1A and 1B are diagrams of an overview of an example implementation described herein.
Figure 1B:
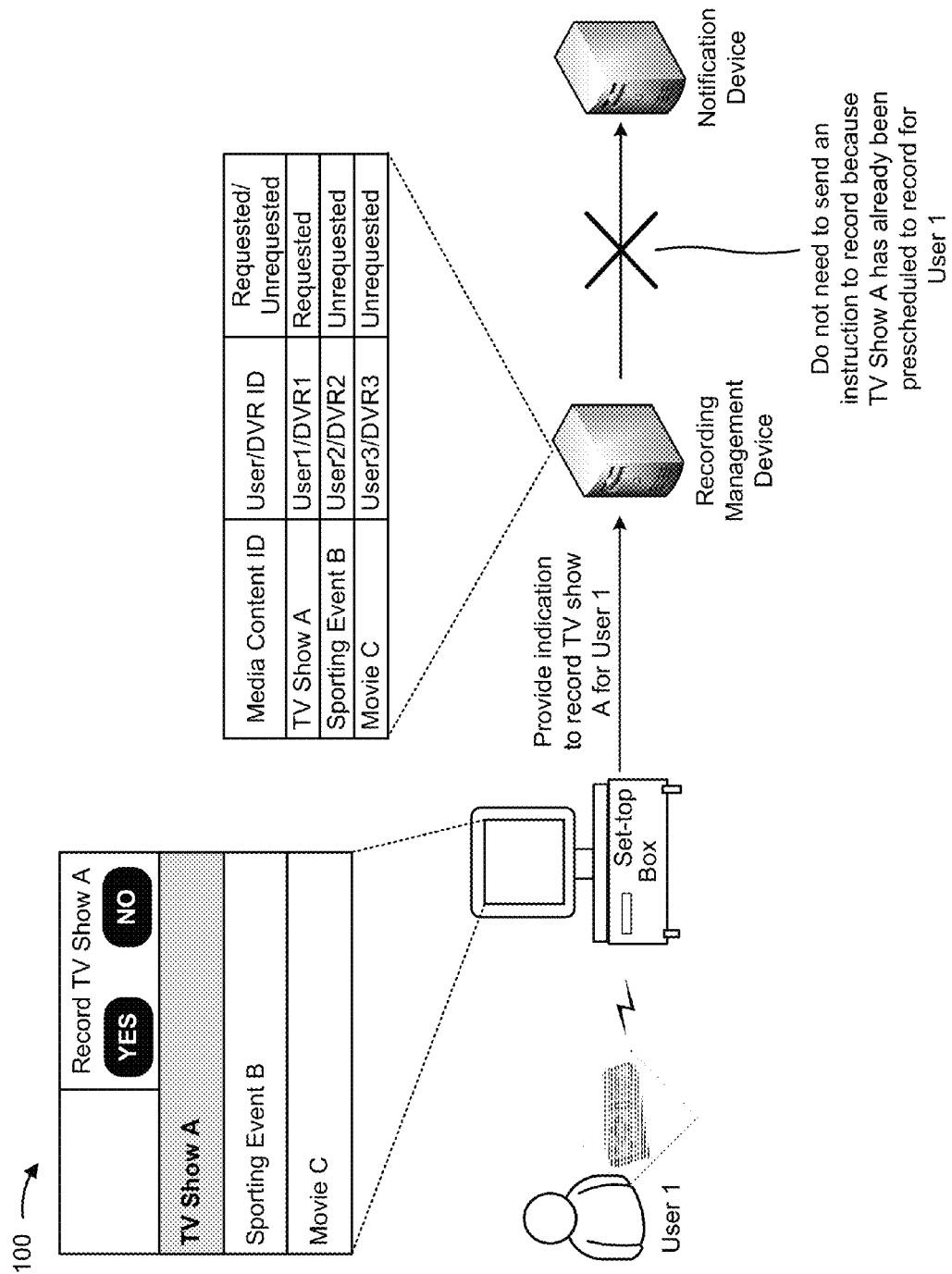

FIGS. 1A and 1B are diagrams of an overview of an example implementation 100 described herein. As shown in FIG. 1A, assume that example implementation 100 includes a recording management device (e.g., a server), a notification device (e.g., a server), and three DVR devices. Assume that the recording management device, without a user request to record, determines popular media content and users or DVR devices for which the media content should be prescheduled for recording. For example, the recording management device may analyze user profile information to identify users (and DVR devices of the users) for which to record a particular type of media content. For example, assume that DVR 1 is owned by User 1, who is a TV fan. The recording management device may preschedule DVR 1 to record a popular TV show, such as TV Show A, without having received a request from User 1 to record TV Show A. As another example, assume that DVR 2 is owned by User 2, who is a sports fan. The recording management device may preschedule DVR 2 to record a popular sporting event, such as Sporting Event B, without having received a request from User 2 to record Sporting Event B. As another example, assume that DVR 3 is owned by User 3, who is a movie fan. The recording management device may preschedule DVR 3 to record a popular movie, such as Movie C, without having received a request from User 3 to record Movie C.

As further shown in FIG. 1A, the recording management device may mark the media content, that is prescheduled for recording, as unrequested to denote that the recording was determined by the recording management device and not based on explicit user input to record the media content. The recording management device may in turn send, to the notification device, an instruction to record media content that is prescheduled for recording. For example, the recording management device may send, to the notification device, an instruction to record TV Show A on DVR 1, Sporting Event B on DVR 2, and/or Movie C on DVR 3. The notification device may then send a command to record the media content to a corresponding DVR device based on the instruction from the recording management device. For example, the notification device may send a command to record TV Show A to DVR 1, may send a command to record Sporting Event B to DVR 2, and may send a command to record Movie C to DVR 3.

As shown in FIG. 1B, assume that User 1 later requests to record TV Show A, closer to a time when TV Show A is transmitted and after the prescheduling by the recording management device. As shown, a set-top box may receive input indicating that User 1 wants to record TV Show A, and may provide an indication that User 1 wants to record TV Show A to the recording management device. The recording management device may mark the prescheduled recording as requested, but does not need to send an instruction, to the notification device, to record TV Show A because TV Show A has already been prescheduled to record on DVR 1, which is associated with User 1.

In this way, the recording management device may reduce network congestion and an amount of processor and/or memory resources needed by the recording management device and/or other devices (e.g., the notification device), particularly during peak times. For example, the recording management device may preschedule recordings during off-peak hours to reduce network traffic to the notification device during peak hours at or near an event. This may help prevent the network from becoming overburdened and save on processor and/or memory resources for the recording management device and/other devices. This may also help to ensure that recordings are not delayed, and that each request to record successfully results in a recording.

Figure 2:
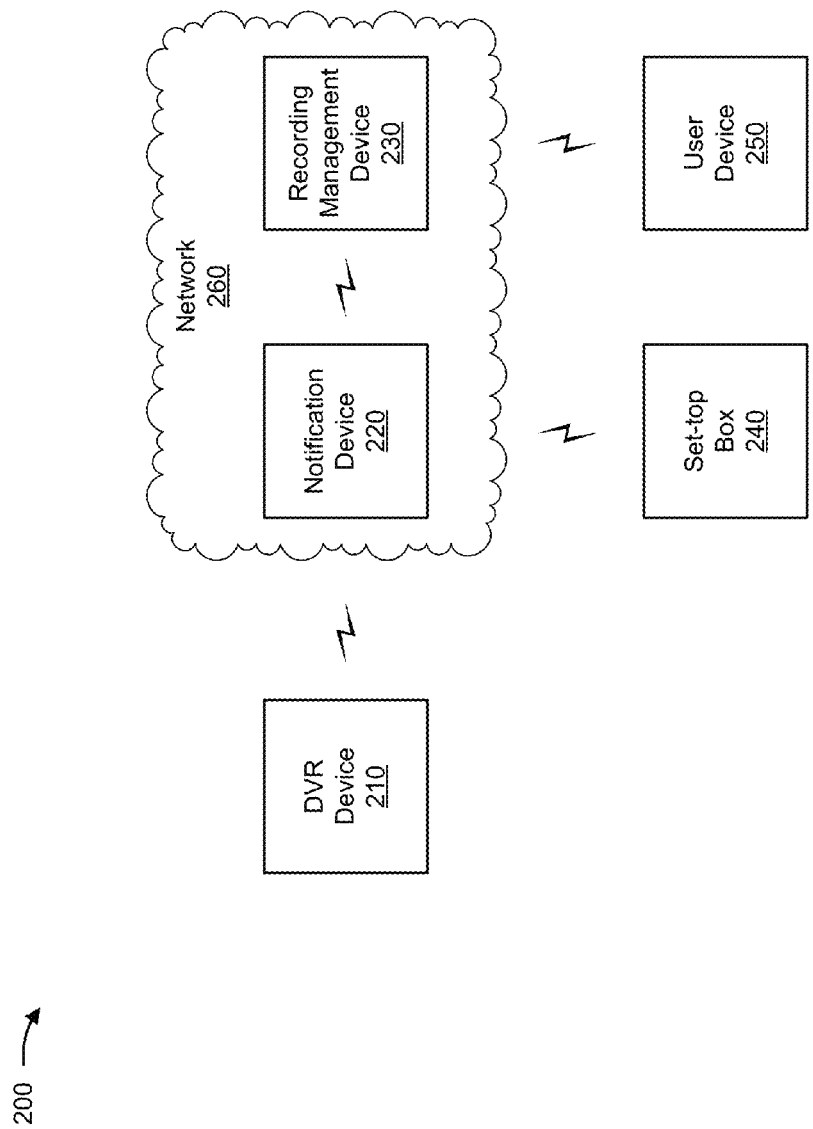
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a DVR device 210, a notification device 220, a recording management device 230, a set-top box 240, a user device 250, and/or a network 260. Devices of environment 200 may interconnect via wired connections, wireless connections, or a combination of wired and wireless connections.

DVR device 210 may include one or more devices capable of recording and storing media content. For example, DVR device 210 may include a digital video recorder, a personal video recorder, a disk drive, or a similar type of device. In some implementations, DVR device 210 may receive a command to record media content from notification device 220. Based on the command, DVR device 210 may record the media content. DVR device 210 may store the media content for later playback.

Notification device 220 may include one or more devices capable of receiving, processing, and sending information associated with recording media content. For example, notification device 220 may include a server or a similar type of device. In some implementations, notification device 220 may receive an instruction to record media content from recording management device 230. Based on the instruction, notification device 220 may send a command, to DVR device 210, to record the media content. Additionally, or alternatively, notification device 220 and recording management device 230 may be implemented within a single device.

Recording management device 230 may include one or more devices capable of receiving, processing, and sending information associated with recording media content. For example, recording management device 230 may include a server or a similar type of device. In some implementations, recording management device 230 may receive a request to record media content. For example, recording management device 230 may receive the request from set-top box 240, user device 250, or the like. Additionally, or alternatively, recording management device 230 may determine to pre-schedule media content for recording without receiving explicit user input. For example, recording management device 230 may determine to record media content for a user based on user profile information and/or information regarding media content recorded and/or scheduled for recording by other users. Additionally, or alternatively, recording management device 230 may send an instruction, to notification device 220, to record the media content based on the request to record media content, or based on determining to pre-schedule media content for recording.

Set-top box 240 may include one or more devices capable of providing information regarding media content to a display device for display to a user. For example, set-top box 240 may include a set-top box, or a similar type of device. In some implementations, set-top box 240 may receive input from the user that identifies media content that the user wishes to record. Set-top box 240 may provide, to recording management device 230, a request to record the media content based on this input. In some implementations, set-top box 240 and DVR device 210 may be implemented within a single device.

User device 250 may include one or more devices capable of providing information regarding media content for display to a user and receiving input from the user. For example, user device 250 may include a computer, a laptop, a mobile device (e.g., a smart phone), a remote control, or a similar type of device. In some implementations, user device 250 may provide, to recording management device 230, a request to record the media content based on input from the user.

Network 260 may include one or more wired and/or wireless networks. For example, network 260 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
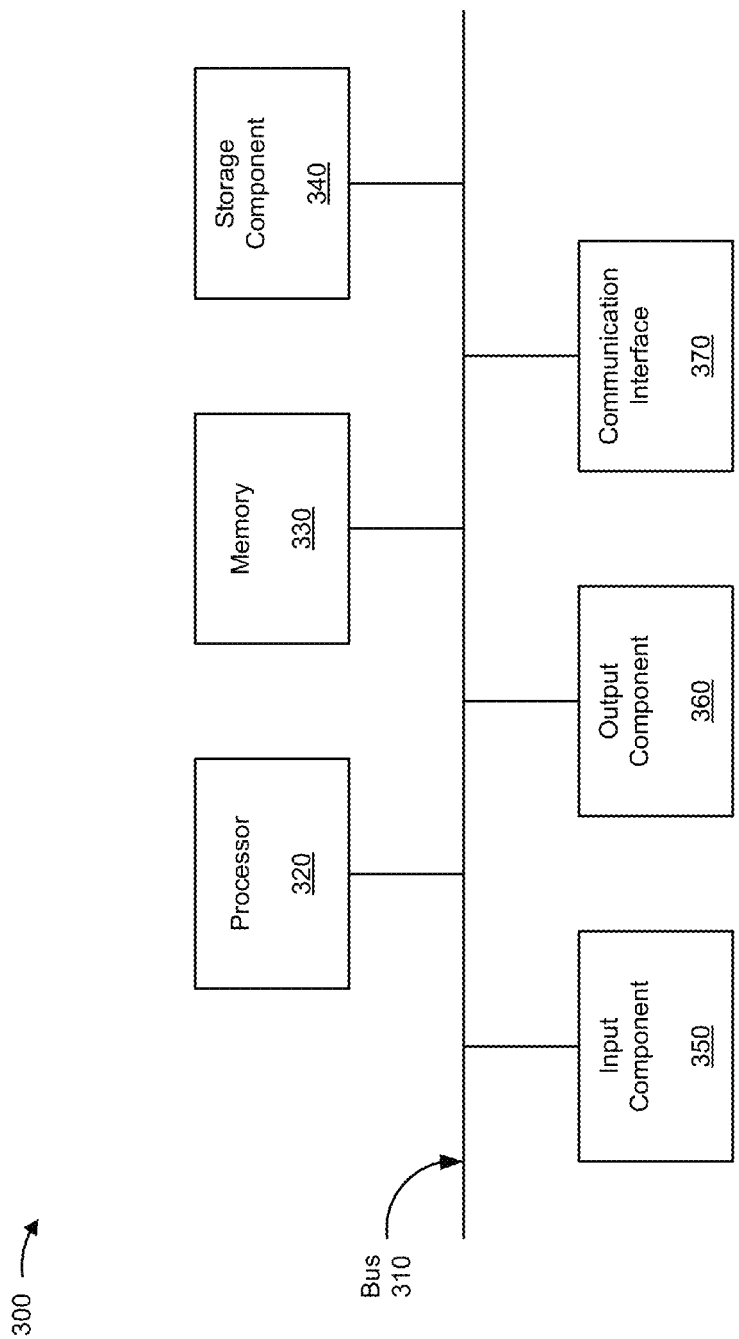
FIG. 3 is a diagram of example components of one or more devices of FIG. 2.

FIG. 3 is a diagram of example components of a device 300. Device 300 may correspond to DVR device 210, notification device 220, recording management device 230, set-top box 240, and/or user device 250. In some implementations, DVR device 210, notification device 220, recording management device 230, set-top box 240, and/or user device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for prescheduling media content for recording. In some implementations, one or more process blocks of FIG. 4 may be performed by recording management device 230. In some implementations, one or more process blocks of FIG. 4 may be performed by another device or a set of devices separate from or including recording management device 230, such as DVR device 210, notification device 220, set-top box 240, and/or user device 250.

As shown in FIG. 4, process 400 may include determining media content to be prescheduled for recording (block 410). For example, recording management device 230 may identify media content. Media content may include audio content and/or visual content, such as a TV show, a movie, a sporting event, a slide show, an image, a song, streaming music, or the like. Additionally, or alternatively, media content may refer to a program (e.g., an item of media content) from a program guide (e.g., an electronic program guide) of the user. In some implementations, an output device (e.g., a TV, a speaker, etc.) may output the media content for presentation to a user.

Recording management device 230 may identify media content for the purpose of prescheduling the media content for recording. In some implementations, prescheduling may refer to scheduling a recording without explicit user input. For example, recording management device 230 may identify media content for recording without receiving input from set-top box 240 or user device 250 to record the media content. Prescheduling may be useful for managing recordings of popular media content, where a large volume of requests to record the media content at or near the same time could produce an overload of traffic on network 260 or an overuse of processor and/or memory resources. This could result in a delay of or failure to record the media content requested by a user.

In some implementations, recording management device 230 may determine the media content based on a quantity of users expected to record the media content. For example, recording management device 230 may use historical information to determine the expected quantity of users. Historical information may refer to, for example, information that identifies a quantity of users who watched a program (e.g., an item of media content) in the past, a quantity of users who listened to a program in the past, a quantity of users who recorded a program, a quantity of users who watched and/or listened to a recording of a program in the past, or the like. For example, recording management device 230 may utilize information that indicates that 1,000,000 users watched the program live last year, that 400,000 users recorded the program last year, and/or that 200,000 users watched a recording of the program last year.

In some implementations, recording management device 230 may compare a quantity of users expected to record the media content to a threshold to determine whether the media content is to be prescheduled for recording. For example, recording management device 230 may estimate demand for the media content based on the historical information, and may compare the estimated demand to a threshold value to determine media content to be prescheduled for recording. In some implementations, recording management device 230 may aggregate historical information associated with multiple users, DVR devices 210, or the like, and may use the aggregated historical information to determine the quantity of users expected to record the media content.

Additionally, or alternatively, recording management device 230 may use information that identifies a quantity of scheduled recordings (e.g., during a particular time period, at a particular point in time, etc.) to determine a quantity of users expected to record the media content and/or to determine media content to be prescheduled for recording. Information that identifies a quantity of recordings may be linked to specific media content and may provide insight into the popularity of the media content. For example, recording management device 230 may use information that indicates that a program has 150,000 requests to record one week before the program is scheduled to be broadcast. In some implementations, recording management device 230 may compare the quantity of scheduled recordings to a threshold to determine whether the media content should be prescheduled for recording.

Additionally or alternatively, recording management device 230 may use operator input to determine media content to be prescheduled for recording. For example, operator input may be used to dictate media content to be prescheduled for recording. For example, if the operator knows that the Super Bowl is a popular program, the operator may provide input that causes recording management device 230 to preschedule the Super Bowl for recording.

As further shown in FIG. 4, process 400 may include determining a DVR device for which the media content is to be prescheduled for recording (block 420). For example, recording management device 230 may identify a DVR device 210 associated with the user for which recording management device 230 will preschedule a recording of the media content. Prescheduling recordings may be helpful because a large volume of requests to record the media content at or near the same time could produce an overload of traffic on network 260 and/or an overload of processor and/or memory resources of recording management device 230 or other devices (e.g., notification device 220), as described above.

In some implementations, recording management device 230 may use user profile information to determine the DVR device 210 for which the media content is to be prescheduled for a recording. A DVR device 210 may be associated with a user. User profile information may include information relating to behavior and/or preferences of a user. For example, user profile information may include a listing of media content that the user has watched or listened to live, has watched or listened to from a recording, has recorded in the past, has purchased in the past, or the like.

In some implementations, user profile information may include information about related media content that the user has viewed, recorded, purchased, or the like. Related media content may be media content that is classified as being similar to the media content (e.g., if the media content is the Super Bowl, then related media content may be football games, football related programs, or the like). For example, if the media content is the Super Bowl, the user profile information for User A may include information about related media content. For example the user profile information for User A may indicate that User A is a frequent viewer of football games, records Monday Night Football every week, and once purchased a football game that was not televised in his area relating to a specific team.

Additionally, or alternatively, the user profile information may include information that identifies a quantity of DVR devices 210 that the user owns and how the user has used the DVR device(s) 210 (e.g., media content that the user has watched or recorded using DVR device 210). The user profile information may also include information on specific subscriptions for which the user has paid. For instance, the user profile information may indicate that User A has paid to have access to all football games. Based on the preceding examples, recording management device 230 may preschedule the Super Bowl for recording to a DVR device 210 associated with User A.

Additionally, or alternatively, recording management device 230 may use information from the user profile information on Additionally, or alternatively, recording management device 230 may use information that associates the user with a class of users to determine the DVR device 210 for which the media content is to be prescheduled for a recording. The user may be associated with this class of users based on similarities between the user profile information of the user and the user profile information of other users in the class. For example, using the above information about User A, User A may be classified as a sports fan, or even more specifically, as a football fan. The class of users may be more specific when the profile information that the class is based on is more specific. For example, the user profile information of User A may show that User A watched a threshold quantity of Baltimore Ravens games last season. Based on this information, User A may be classified as a Baltimore Ravens fan. Based on the preceding examples, recording management device 230 may preschedule a recording of the Super Bowl for all users recording management device 230 has classified as a sports fan, all users recording management device 230 has classified as a football fan, and/or all users recording management device 230 has classified as a Baltimore Ravens fan (when, for instance, the Baltimore Ravens play in the Super Bowl).

Additionally, or alternatively, recording management device 230 may use user profile information of the class of users, associated with the user, to determine the DVR device 210 for which the media content is to be prescheduled for a recording. For example, User B may be classified as a fan of action films. Recording management device 230 may use profile information of other users who have been classified as action fans, to determine what to preschedule for User B. If, for instance, many other users classified as fans of action films watched a film named Car Chase in previous showings or scheduled to record the program at the next showing, recording management device 230 may use this information to determine to preschedule a recording of Car Chase for User B.

Additionally, or alternatively, recording management device 230 may use operator input to determine the DVR device 210 for which the media content is to be prescheduled for a recording. In this implementation, the operator may explicitly designate a DVR device 210 or multiple DVR devices 210 for which the media content is to be prescheduled for a recording. The DVR devices 210 may be associated with a particular classification of users. For instance, the operator could provide input to instruct recording management device 230 to preschedule a recording of the Super Bowl for all users, all sports fans, or any specific user the operator identifies.

In some implementations, the user may be associated with (e.g., may own) more than one DVR device 210. In some implementations, recording management device 230 may preschedule the recording for all DVR devices 210 associated with the user. In other implementations, recording management device 230 may preschedule recordings for a particular DVR device 210 of the user (e.g., based upon a history and usage of each DVR device 210). For instance, User A may watch football from a particular DVR device 210, so recording management device 230 may preschedule the Super Bowl to record on that particular DVR device 210. However, User B may watch action films from two separate DVR devices, so recording management device 230 may record the action film on both DVR devices 210.

As further shown in FIG. 4, process 400 may include generating a prescheduling notification associated with the media content and the DVR device (block 430). For example, recording management device 230 may create a prescheduling notification. In some implementations, the prescheduling notification is an instruction, to record media content, that is not based on explicit user input, such as a request to record from set-top box 240. The prescheduling notification may include a media content identifier, that is information that identifies the media content, and may include a DVR device identifier, that is information that identifies the DVR device 210 for which to record the media content.

In some implementations, the media content identifier may include a title of the media content, a channel on which the media content will be provided, a start and/or end time associated with the media content, a media identifier of the media content (e.g., a unique string of characters associated with that media content), or the like. For example, the media content identifier may include information that indicates that the title of the media content is "Super Bowl," that the media content is on channel 10, that the media content starts at 7 p.m. on January 30 and ends at 11 p.m. on January 30, and that the media identifier is 1034453A.

In some implementations, the DVR device identifier may include a network address of the DVR device 210. A network address may include an address assigned to a device by a network, such as an internet protocol (IP) address, an address hard-coded into the device itself such as a media access control (MAC) address, or the like. For example, DVR device 210 may have an IP address of 10.17.143.32 and a MAC address of 00-12-3B-35-04-D2.

Recording management device 230 may format a prescheduling notification to associate more than one item of media content with the DVR device 210, more than one DVR device 210 with the item of media content, or more than one item of media content with more than one DVR device 210. For example, a prescheduling notification may indicate that DVR A is to record the Super Bowl and Car Chase, that DVR A and DVR B are to record the Super Bowl, or that DVR A and DVR B are to record the Super Bowl and Car Chase.

As further shown in FIG. 4, process 400 may include marking the prescheduling notification as unrequested (block 440). For example, recording management device 230 may mark the prescheduling notification as unrequested. In some implementations, recording management device 230 may mark the prescheduling notification as unrequested by storing information from the prescheduling notification along with an indication that the prescheduling notification was unrequested, meaning that the prescheduling notification was not generated from a request to record by the user. Recording management device 230 may mark the prescheduling notification as unrequested to keep track of which items of media content the user has requested to record and which items of media content the user has not requested to record. Recording management device 230 may use this information to manage recordings, as described in more detail herein.

Additionally, or alternatively, recording management device 230 may store some combination of information that identifies a user, information that identifies a DVR device 210 (e.g., a DVR device identifier), information that identifies an item of media content to be recorded for the user (e.g., a media content identifier) and/or by the DVR device 210, and information that indicated whether the recording was explicitly requested by the user.

As further shown in FIG. 4, process 400 may include providing, to a notification device, an instruction to record the media content, using the DVR device, based on the prescheduling notification (block 450). For example, recording management device 230 may provide, to notification device 220, an instruction to record the media content in order to preschedule a recording. Recording management device 230 may provide the prescheduling notification by transmitting the prescheduling notification over network 260.

In some implementations, the instruction to record may be based on the prescheduling notification. For example, the prescheduling notification may include a media content identifier and a DVR device identifier. Additionally, or alternatively, recording management device 230 may send, to notification device 220, an instruction to record the media content based on a request from a user received from set-top box 240 or user device 250. Notification device 220 may treat instructions to record based on the request the same as instructions to record based on the prescheduling notification. For example, notification device 220 may treat a notification request to record the Super Bowl based on a request received from set-top box 240 exactly the same as a notification request to record the Super Bowl based on the prescheduling notification.

In some implementations, when notification device 220 receives the instruction to record, notification device 220 may send a command to DVR device 210. The instruction to record may include a DVR device identifier and a media content identifier. Notification device 220 may determine which DVR devices 210 to send the command to from the instruction to record. For example, the instruction to record may contain a DVR identifier that identifies DVR A and DVR B, and notification device 220 may send a command to both DVR A and DVR B. The command sent to DVR device 210 may include information in the instruction that identifies the media content to record (e.g., a media content identifier), such as the start and end time, the channel, and the title of the media content. For example, the command to record the Super Bowl may include: a start time of January 30, 7 p.m.; an end time of January 30, 11 p.m.; information that channel 10 is the broadcast channel; and the title, "Super Bowl L."

In some implementations, recording management device 230 may provide the instruction to record during off-peak hours. Recording management device 230 may determine off-peak hours based on a time of day. For example, recording management device 230 may provide instructions every night between 2 a.m. and 3 a.m. Additionally, or alternatively, recording management device 230 may determine off-peak hours from a threshold amount of traffic on network 260 at a particular time. Recording management device 230 may receive information regarding traffic on network 260 from one or more network devices operating in network 260. For example, recording management device 230 may provide instructions when recording management device 230 receives an indication that the traffic on the network is below 30% of the maximum load.

Figure 6:
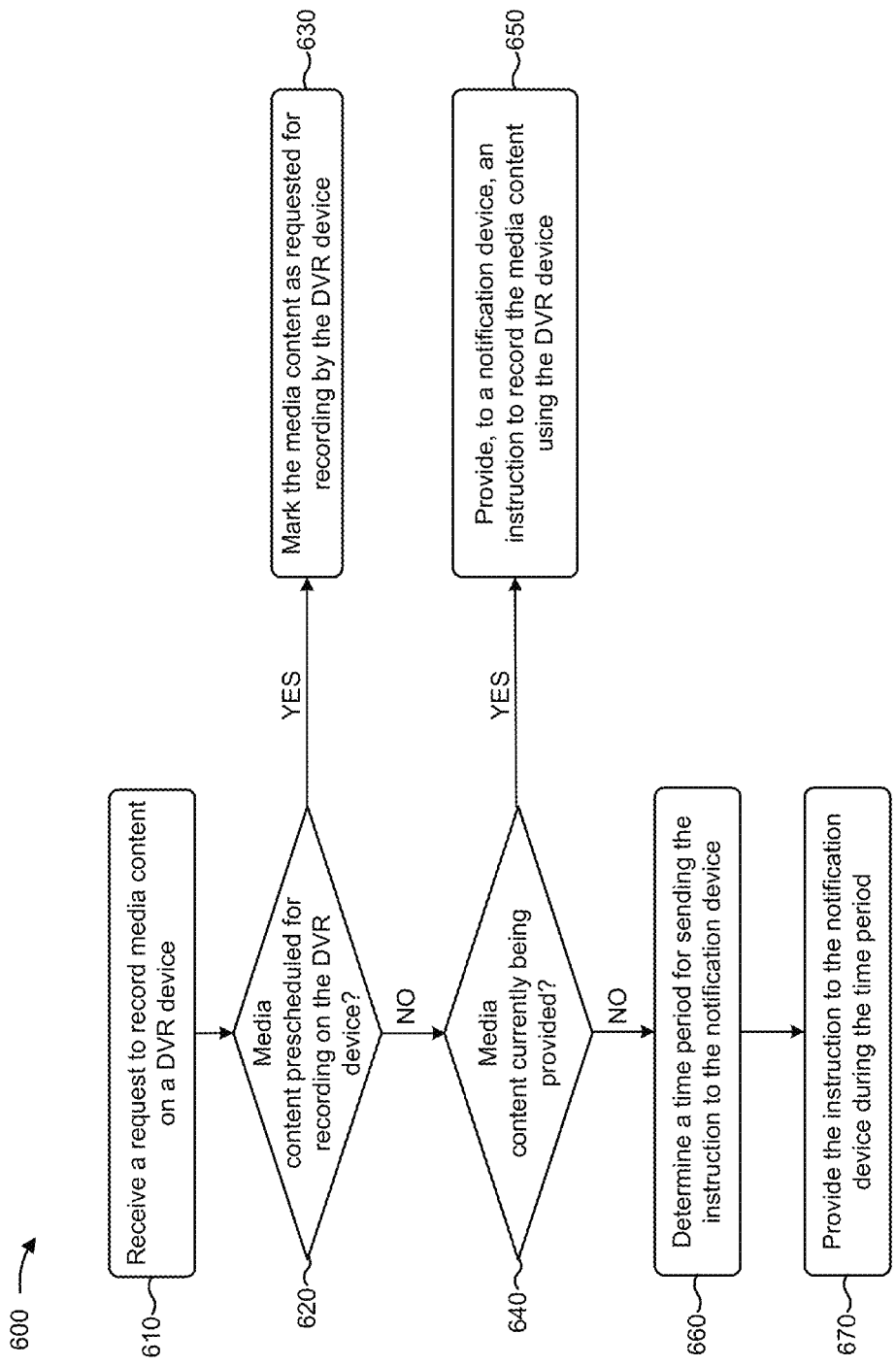
FIG. 6 is a flow chart of an example process for managing an indication of a user request to record media content.

Additionally, or alternatively, recording management device 230 may provide, to notification device 220, the instruction to record based on a quantity of instructions to record already in a queue and an amount of time until the start of the program, as described in more detail herein in connection with FIG. 6.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5D are diagrams of an example implementation 500 relating to example process 400 shown in FIG. 4. FIGS. 5A-5D show an example for prescheduling media content for recording.

Figure 5A:
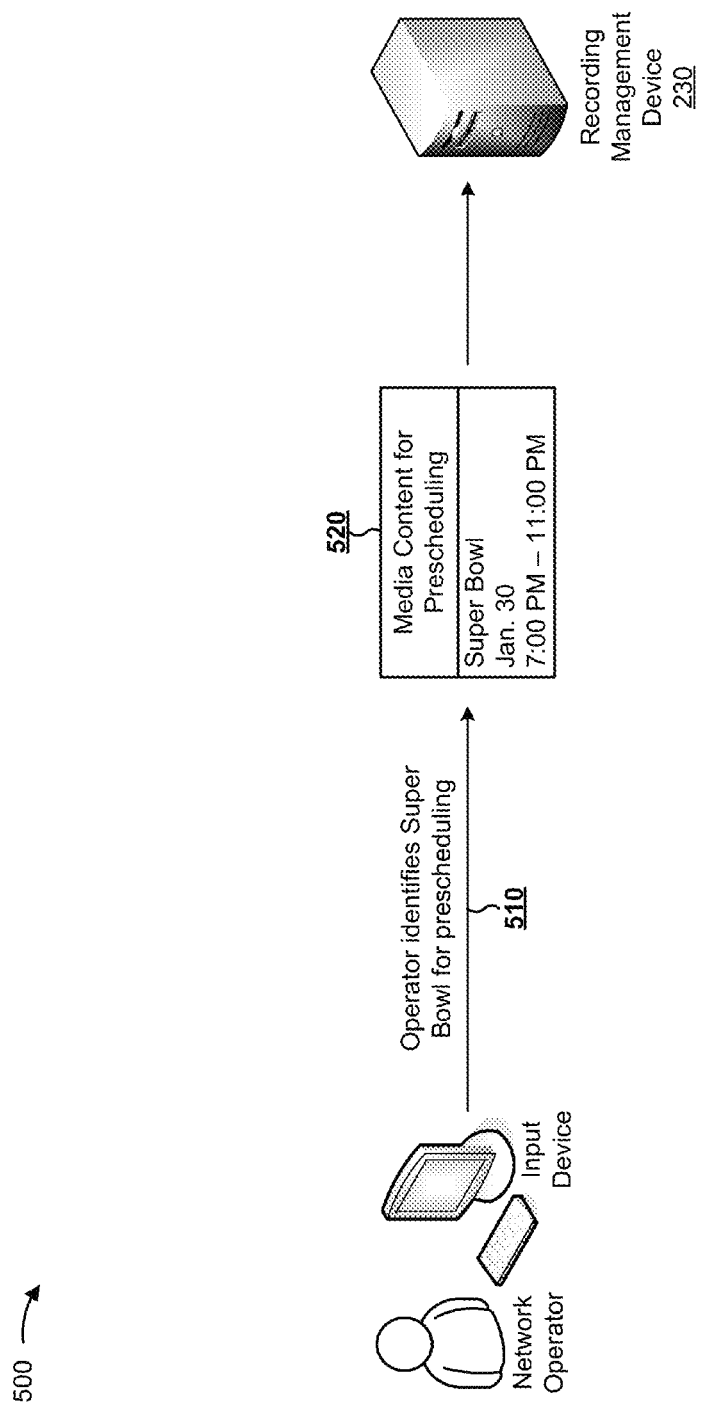
FIGS. 5A-5D are diagrams of an example implementation relating to the example process shown in FIG. 4.

As shown in FIG. 5A, and by reference number 510, assume that a network operator, using an input device, identifies the Super Bowl for prescheduling. As shown by reference number 520, the operator may identify the Super Bowl as the media content for prescheduling using a title (e.g., Super Bowl), a date (e.g., January 30), a start time (e.g., 7:00 p.m.), and an end time (e.g., 11:00 p.m.). The input device sends information that identifies the media content (e.g., the Super Bowl) to recording management device 230.

Figure 5B:
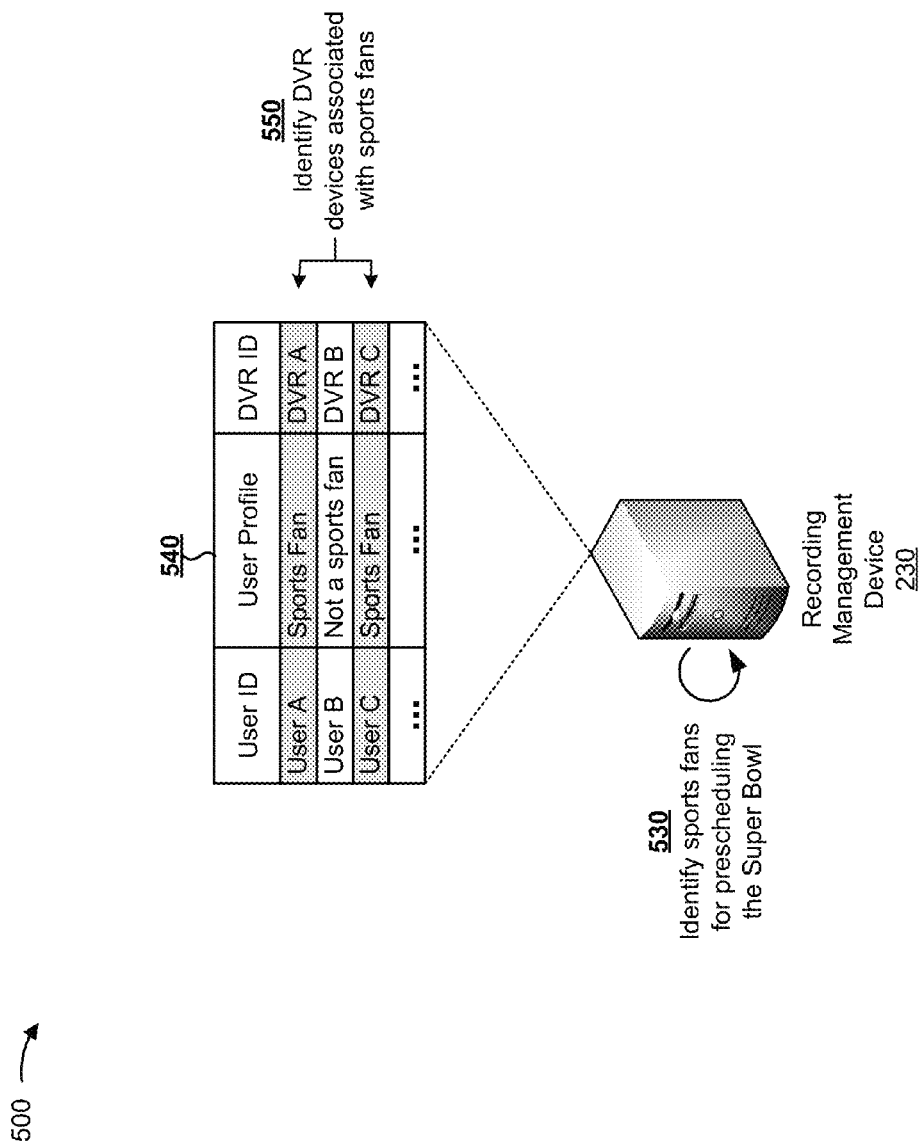

As shown in FIG. 5B, and by reference number 530, recording management device 230 identifies sports fans for the Super Bowl prescheduling. As shown by reference number 540, recording management device 230 stores information in a data structure that links information that identifies the user (User ID) to user profile information associated with the user (User Profile) and to a DVR device identifier of the user (DVR ID). For example, assume that User A is a sports fan and is associated with DVR A, User B is not a sports fan and is associated with DVR B, and User C is a sports fan and is associated with DVR C. As shown by reference number 550, recording management device 230 identifies the DVR devices 210 associated with sports fans. Thus, recording management device 230 identifies DVR A and DVR C as associated with sports fans.

Figure 5C:
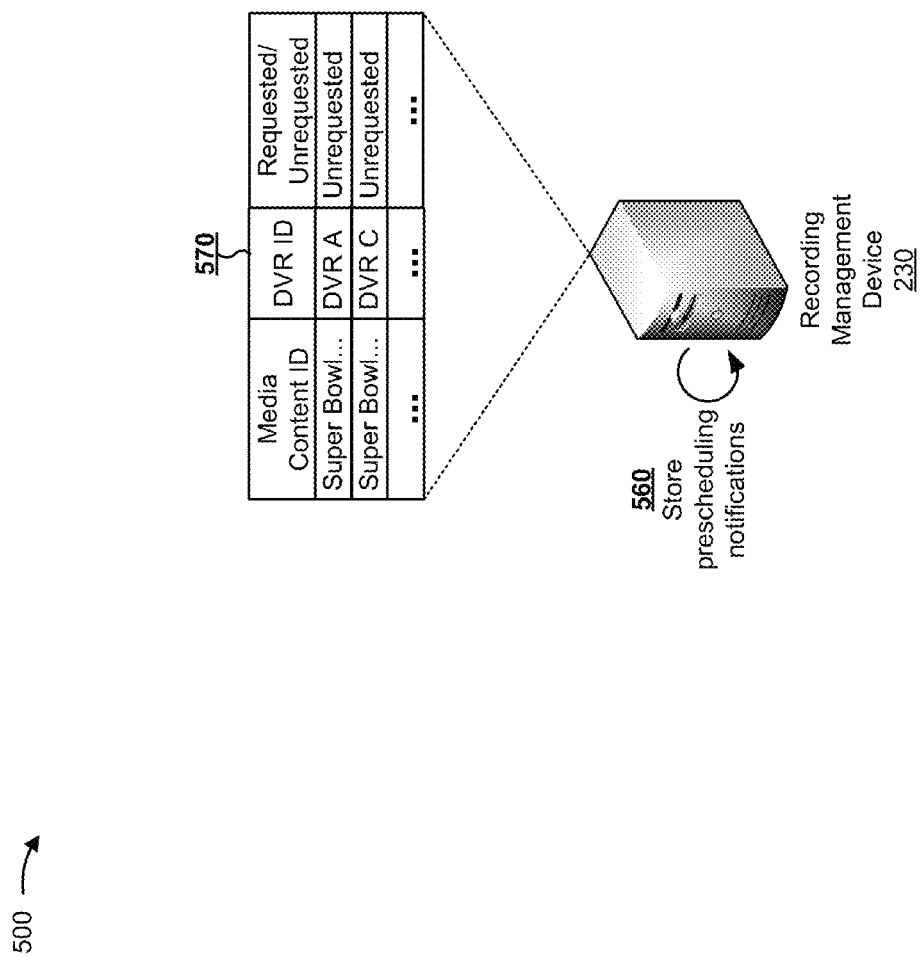

As shown in FIG. 5C, and by reference number 560, recording management device 230 stores prescheduling notifications associated with the Super Bowl and DVR devices 210 for which the Super Bowl is to be prescheduled for recording. As shown by reference number 570, the prescheduling notifications are stored and tracked as information in a data structure, which links a media content identifier (Media Content ID) to a DVR device identifier (DVR ID) and information that identifies whether the user has requested a recording (Requested/Unrequested). For example, assume that DVR A and DVR C are prescheduled to record the Super Bowl. Neither DVR A nor DVR C has had a request from a user to record the Super Bowl, so the recordings are marked as unrequested.

Figure 5D:
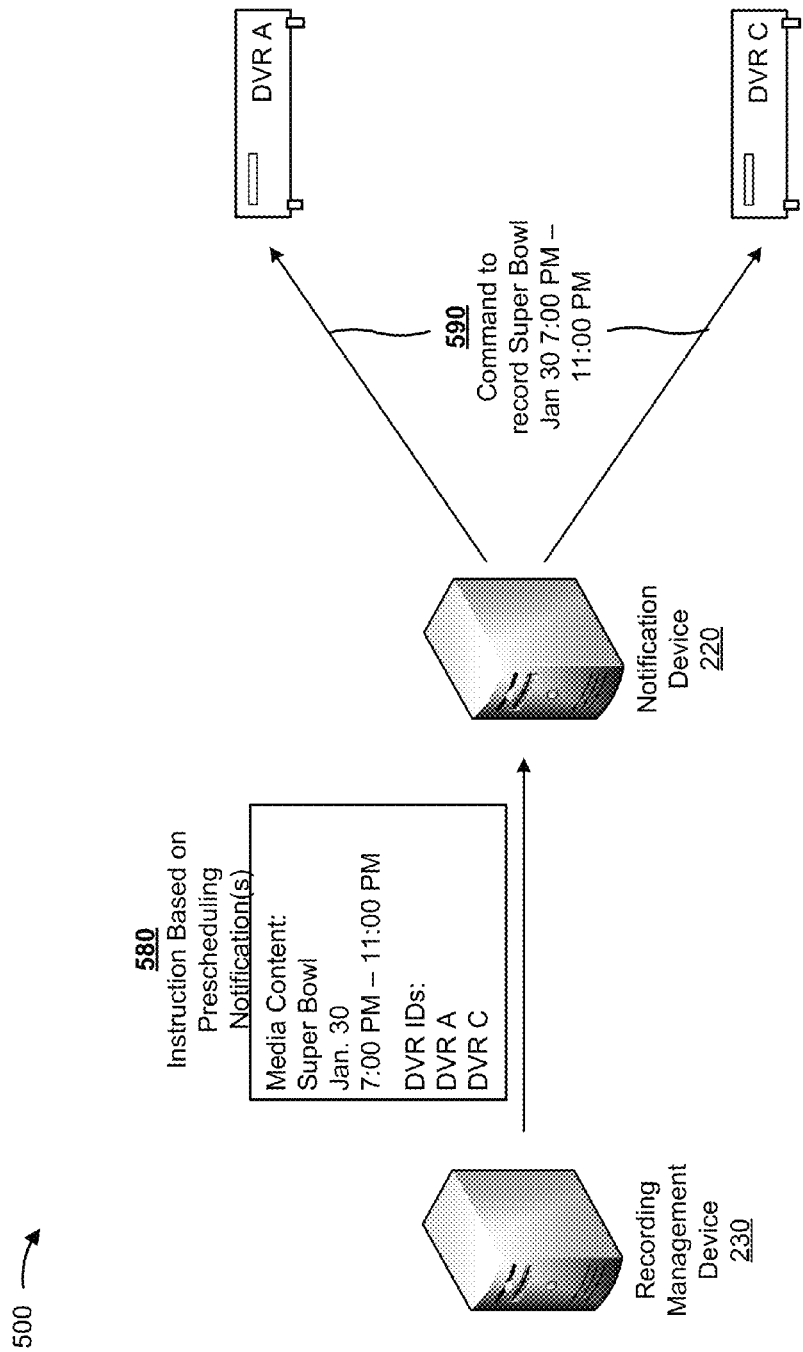

As shown in FIG. 5D, and by reference number 580, recording management device 230 sends, to notification device 220, an instruction to record based on the prescheduling notification(s). In some implementations, recording management device 230 may send the notification during off-peak hours to alleviate network congestion. As shown, the prescheduling notification(s) indicate that the Super Bowl is to be recorded by DVR A and DVR C. As shown by reference number 590, notification device 220 sends a command to record the Super Bowl to DVR A and DVR C. Based on the command from notification device 220, DVR A and DVR C store an indication to record the Super Bowl, such that DVR A and DVR C record the Super Bowl when the Super Bowl is broadcast. Prescheduling in this way may be useful in limiting an amount of traffic on network 260 and reducing the amount of processor and/or memory resources used by recoding management device 230 and/or notification device 220 at or near the time of a popular item of media content (e.g., the Super Bowl). Limiting the amount of network traffic may help ensure that all requests to record result in a recording and that no recordings are delayed.

As indicated above, FIGS. 5A-5D are provided merely as an example. Other examples are possible and may differ from what was described with regard to FIGS. 5A-5D.

FIG. 6 is a flow chart of an example process 600 for managing an indication of a user request to record media content. In some implementations, one or more process blocks of FIG. 6 may be performed by recording management device 230. In some implementations, one or more process blocks of FIG. 6 may be performed by another device or a set of devices separate from or including recording management device 230, such as DVR device 210, notification device 220, set-top box 240, and/or user device 250.

As shown in FIG. 6, process 600 may include receiving a request to record media content on a DVR device (block 610). For example, recording management device 230 may receive a request to record media content on a particular DVR device 210. In some implementations, the user may input the request using set-top box 240 or user device 250, and set-top box 240 or user device 250 may provide the request to recording management device 230. The request may include the media content identifier to be recorded and the DVR device identifier for which to record the media content. For example, the request to record may identify a specific program (e.g., Car Chase) to record for the user on a specific DVR device 210 (e.g., DVR B).

As further shown in FIG. 6, process 600 may include determining whether the media content has been prescheduled for recording on the DVR device (block 620). For example, recording management device 230 may determine whether the media content, for which the request to record was received, has already been prescheduled for recording on the DVR device 210. In some implementations, recording management device 230 may determine this by using the media content identifier and the DVR device identifier in the request, and comparing the media content identifier and the DVR device identifier to information previously stored based on the prescheduling notifications, as described above in connection with FIG. 4.

As further shown in FIG. 6, if the media content has been prescheduled for recording on the DVR device (block 620—YES), then process 600 may include marking the media content as requested for recording by the DVR device (block 630). For example, when recording management device 230 determines that the media content, from the request to record, has been prescheduled for recording on DVR device 210, recording management device 230 may mark the media content as requested. In some implementations, recording management device 230 may mark the media content as requested by changing the information recording management device 230 has stored from the prescheduling notification as described with regard to process 400 (block 440) to indicate that the media content has been requested for recording by the user. For example, if recording management device 230 has already prescheduled a recording of Car Chase for DVR B, then a user request to record Car Chase on DVR B may prompt recording management device 230 to change the information stored from the prescheduling notification to indicate that the recording of Car Chase is requested (e.g., change from unrequested to requested).

In some implementations, marking the media content as requested for recording may be useful because unrequested recordings may be handled differently than requested recordings. For example, in some implementations, recording management device 230 may provide an instruction to prevent unrequested recordings from being presented to the user (e.g., when providing a listing of recordings on DVR device 210) until a request to record is received. Additionally, or alternatively, recording management device 230 may provide an instruction (e.g., a delete command) to DVR device 210 to delete unrequested recordings (but not requested recordings) after a threshold amount of time. In some implementations, requested recordings and unrequested recordings may be added to the user profile information for the user. In some implementations, requested recordings, but not unrequested recordings, may be added to the user profile information for the user.

As further shown in FIG. 6, if the media content has not been prescheduled for recording on the DVR device (block 620—NO), then process 600 may include determining whether the media content is currently being provided (block 640). For example, when recording management device 230 determines that the media content, from the request to record, has not been prescheduled for recording on DVR device 210, recording management device 230 may determine whether the media content is currently being provided and/or is scheduled to be provided within a threshold period of time. As an example, recording management device 230 may determine whether media content is being provided by determining whether the media content is being broadcast, transmitted, or the like. Additionally, or alternatively, recording management device 230 may determine if the media content is being provided by extracting the start time and/or end time of the media content and comparing the start time and end time to the current time. Additionally, or alternatively, recording management device 230 may compare the media content identifier to information that recording management device 230 stores with regard to all media content that is being provided (e.g., a program guide) to determine if the media content is currently being provided. In some implementations, recording management device 230 may store the media content identifier and DVR device identifier from the request, along with an indication that the recording has been requested.

As further shown in FIG. 6, if the media content is currently being provided (block 640—YES), then process 600 may include providing, to a notification device, an instruction to record the media content using the DVR device (block 650). For example, when recording management device 230 determines that the media content is currently being provided, or being provided within a threshold amount of time, recording management device 230 may provide, to notification device 220, an instruction to record the media content using DVR device 210. The instruction may include the media content identifier and the DVR device identifier. For example, the instruction to record may indicate that Car Chase is to be recorded on DVR B at a particular time on a particular channel. Notification device 220 may send a command to record to DVR device 210 based on the instruction as described elsewhere herein.

In some implementations, recording management device 230 may prioritize sending of the instruction to record, when recording management device 230 determines that the media content is currently being provided or being provided within the threshold amount of time, so that recording management device 230 can ensure that DVR device 210 records the media content that was requested. Because the media content is currently being provided, the instruction to record is timely and recording management device 230 may prioritize the recording to ensure the recording occurs.

As further shown in FIG. 6, if the media content is not currently being provided (block 640—NO), then process 600 may include determining a time period for sending the instruction to the notification device (block 660). For example, when recording management device 230 determines that the media content is not currently being provided or being provided within a threshold amount of time, recording management device 230 may determine a time period for sending the instruction to notification device 220. For example, recording management device 230 may determine the start time of the media content and determine that the start time is in the future, and as a result determine the time period to send the instruction.

In some implementations, the time period may be determined by a queuing technique for queuing instructions. For example, recording management device 230 may create queues that include instructions to be sent to notification device 220. A queue may correspond to a particular period of time before the start time of a program (e.g., an item of media content). For example, a first queue may store instructions to be sent during a first time period (e.g., between zero to five minutes) before the program starts. A second queue may store instructions to be sent during a second time period (e.g., between five minutes to ten minutes) before the program starts. The length of the time periods may be the same (uniform) or different (non-uniform). The queue may be associated with a threshold that indicates a maximum quantity of instructions that may be stored in the queue (e.g., to ensure that all instructions can be sent during the time period).

In some implementations, when recording management device 230 generates a new instruction to record, recording management device 230 may determine the quantity of instructions in the first queue and may compare the quantity to the threshold. If the quantity satisfies (e.g., is less than) the threshold, recording management device 230 may add the instruction to the first queue. If the quantity does not satisfy (e.g., is greater than or equal to) the threshold, recording management device 230 may analyze other queues sequentially (e.g., either with increasing time periods or decreasing time periods) to identify a queue where the quantity of instructions satisfies the threshold. Recording management device 230 may add the instruction to the identified queue. If no queue satisfies the threshold, then recording management device 230 may add the instruction to the first queue and may increment the threshold (e.g., if the threshold was previously 100, it would now be 101).

As further shown in FIG. 6, process 600 may include providing the instruction to the notification device during the time period (block 670). For example, recording management device 230 may send, to notification device 220, the notification to record during the time period determined by recording management device 230. The instruction may include the media content identifier and the DVR device identifier. Notification device 220 may send a command to record to the DVR device 210 based on the instruction as described elsewhere herein. By sending the instruction during the time period determined by the queuing technique, recording management device 230 may avoid sending a large volume of instructions to record during the same time period. Thus, recording management device 230 may reduce congestion on network 260 and may reduce processor and/or memory resources used by recording management device 230 and/or other devices. Therefore, fewer instructions to record may be lost or delayed.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIGS. 7A-7E are diagrams of an example implementation 700 relating to example process 600 shown in FIG. 6. FIGS. 7A-7E show an example of managing an indication of a user request to record media content.

Figure 7A:
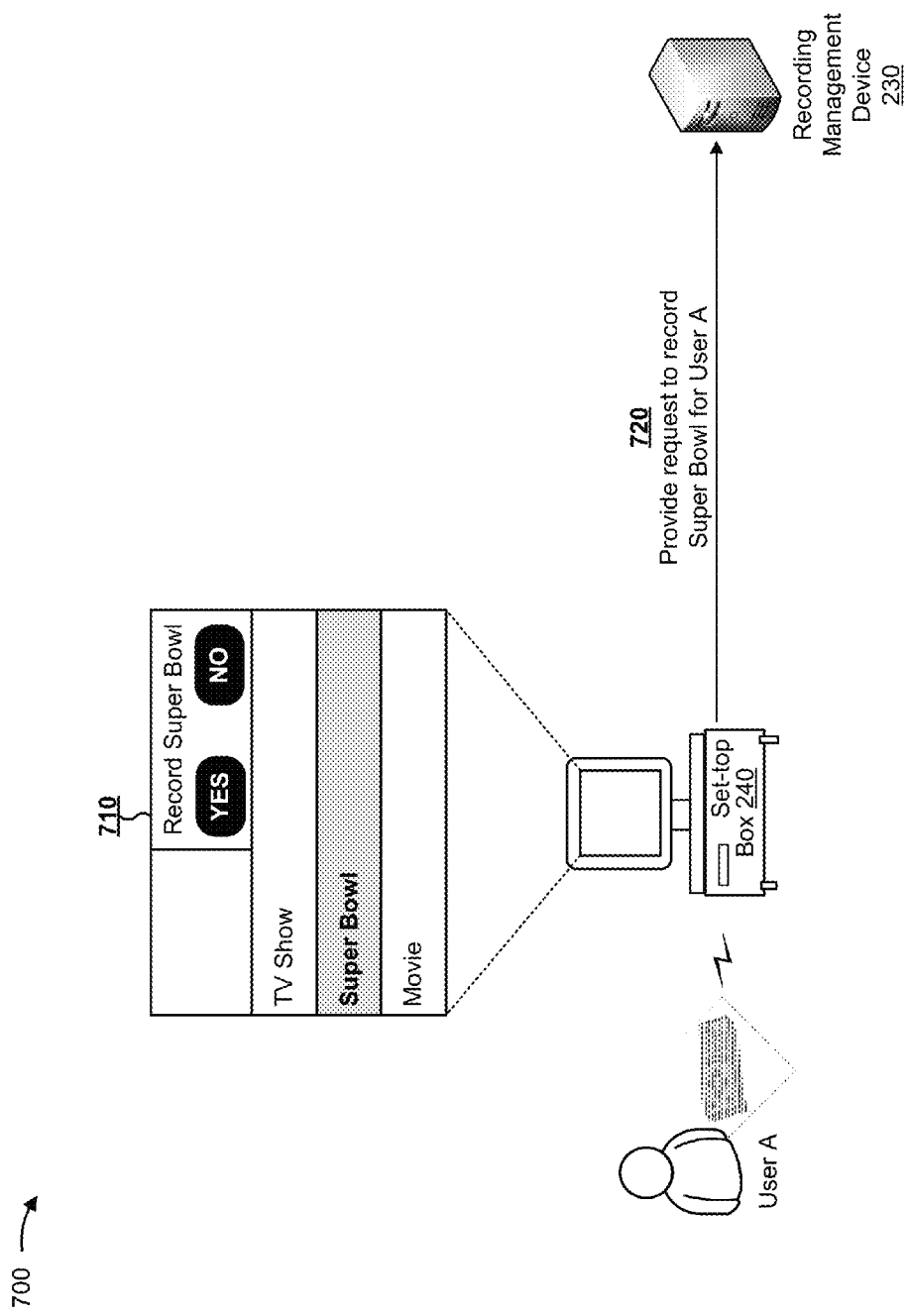
FIGS. 7A-7E are diagrams of an example implementation relating to the example process shown in FIG. 6.

As shown in FIG. 7A, and by reference number 710, assume that User A uses set-top box 240 to request to record the Super Bowl. As shown by reference number 720, set-top box 240 provides the request to record the Super Bowl, for User A, to recording management device 230.

Figure 7B:
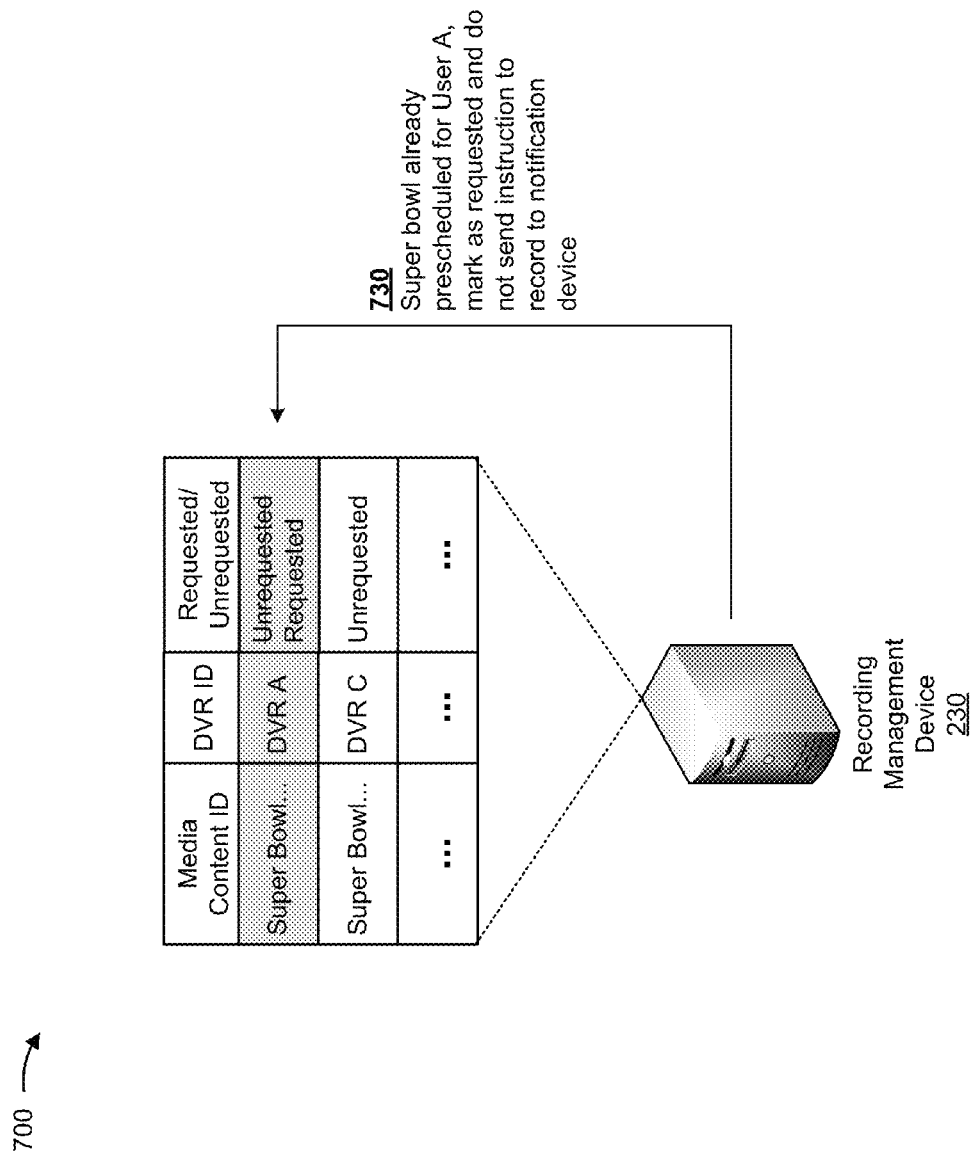

As shown in FIG. 7B, and by reference number 730, recording management device 230 compares the request to record from User A to information stored in a data structure. Assume that the data structure links the media content identifier (Media Content ID) to the DVR device identifier (DVR ID) and information that identifies whether the user has requested a recording (Requested/Unrequested). If the indication to record is already prescheduled, recording management device 230 changes the information stored in the data structure to indicate that the recording has now been requested. For example, assume that DVR A, which is associated with User A, has already been prescheduled for a recording of the Super Bowl. Recording management device 230 updates the data structure to indicate that the Super Bowl is now a requested recording for DVR A. Also, recording management device 230 does not send an instruction to record to notification device 220 because the instruction to record was sent or scheduled to be sent when the media content was prescheduled.

Figure 7C:
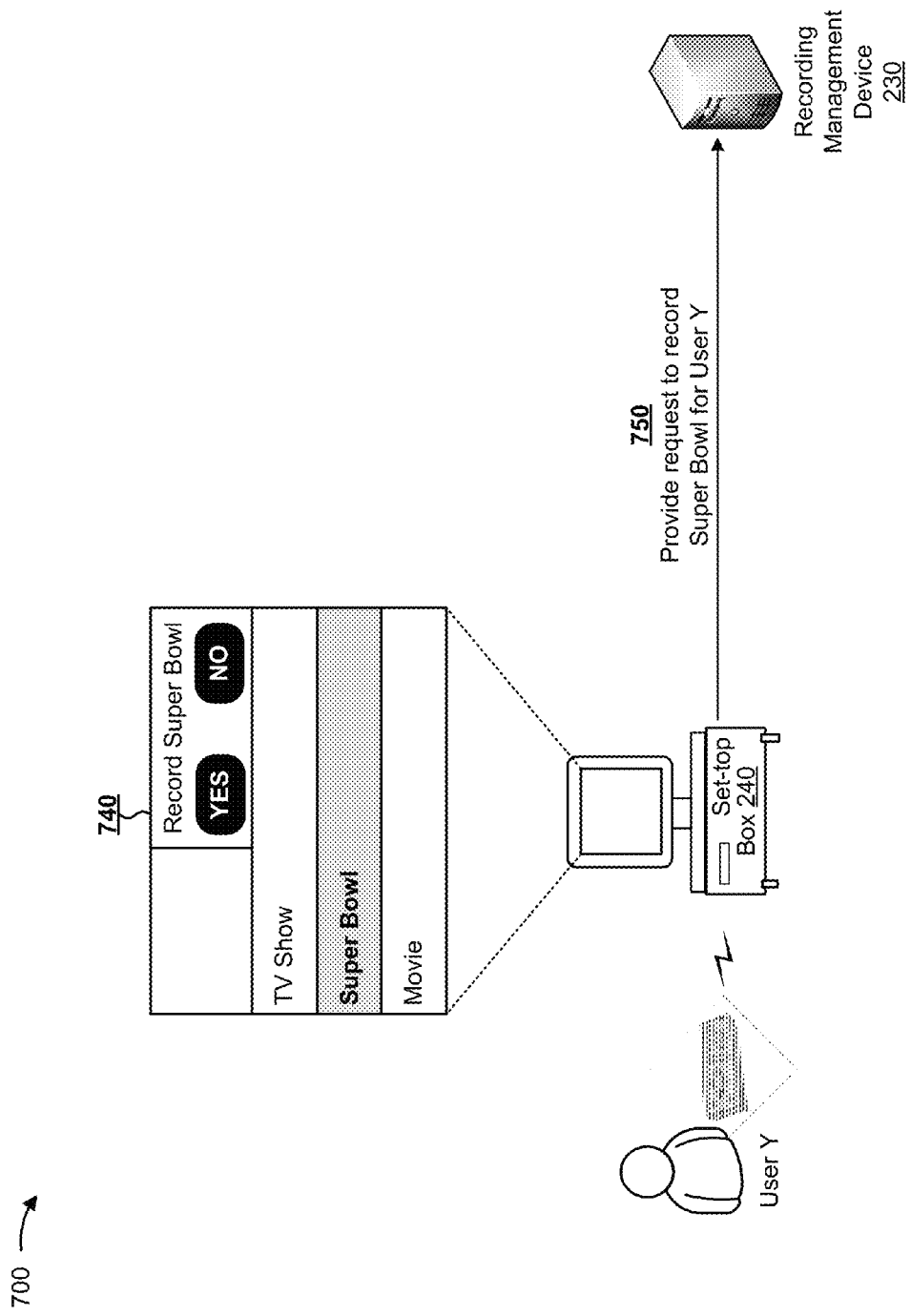

As shown in FIG. 7C, and by reference number 740, assume that User Y uses set-top box 240 to request to record the Super Bowl. As shown by reference number 750, set-top box 240 provides the request to record the Super Bowl, for User Y, to recording management device 230.

Figure 7D:
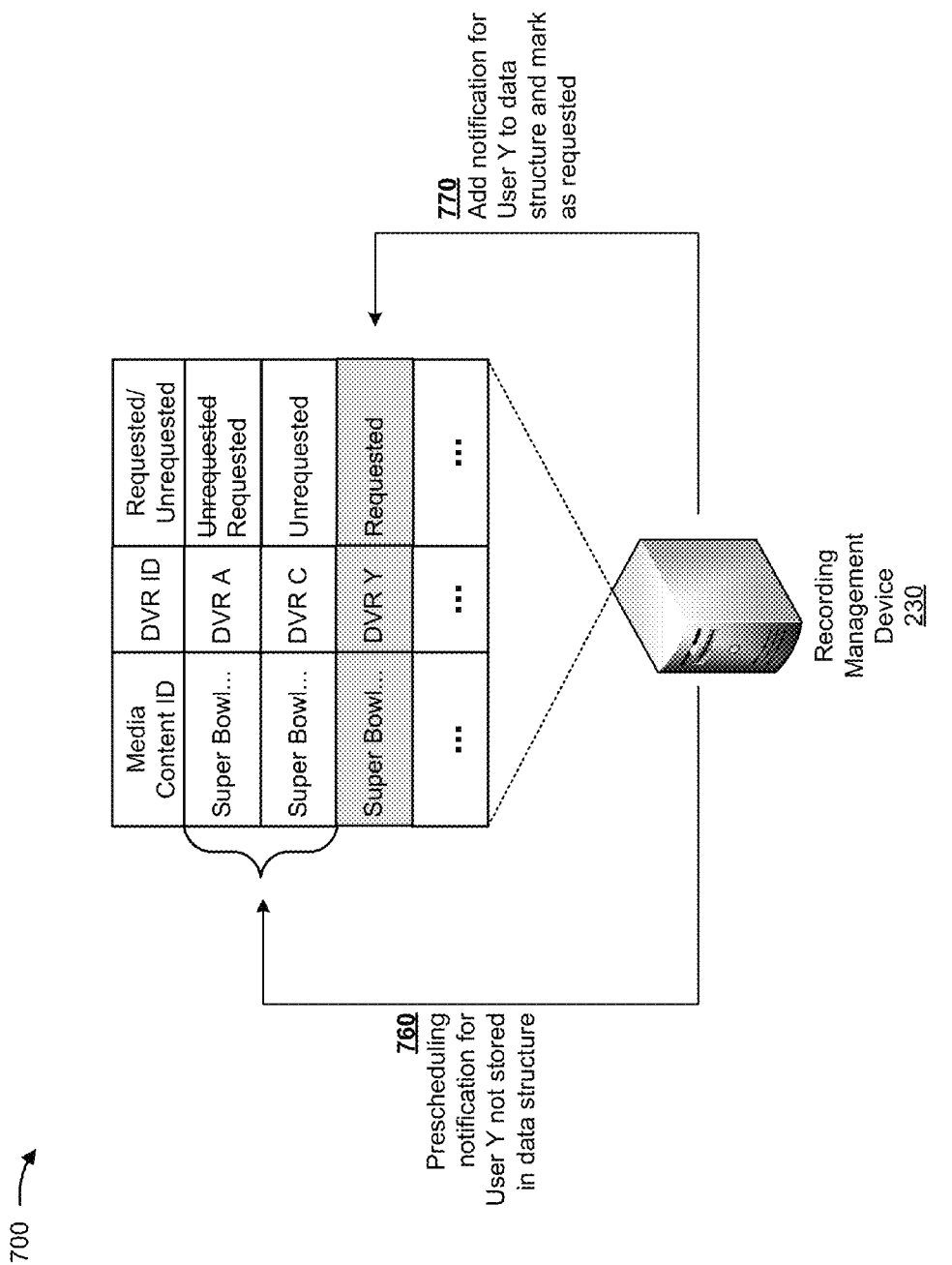

As shown in FIG. 7D, and by reference number 760, recording management device 230 compares the request to record from User Y to information stored in a data structure. Assume that the data structure links information the media content identifier (Media Content ID) to the DVR device identifier (DVR ID) and information that identifies whether the user has requested a recording (Requested/Unrequested). Assume that the indication to record for User Y is not prescheduled. Thus, DVR Y, which is associated with User Y, has not already been prescheduled for a recording of the Super Bowl. As shown by reference number 770, recording management device 230 stores information based on the request (e.g., the Media Content ID, the DVR ID, and that the recording is requested). For example, recording management device 230 stores information in the data structure that links DVR Y to an indication to record the Super Bowl, and indicates that the user has requested this recording (e.g., the Media Content ID is Super Bowl, the DVR ID is Y, and the media content has been requested to record). Recording management device 230 sends, to notification device 220, an instruction to record or schedules to send an instruction to record, based on the request by the user.

Figure 7E:
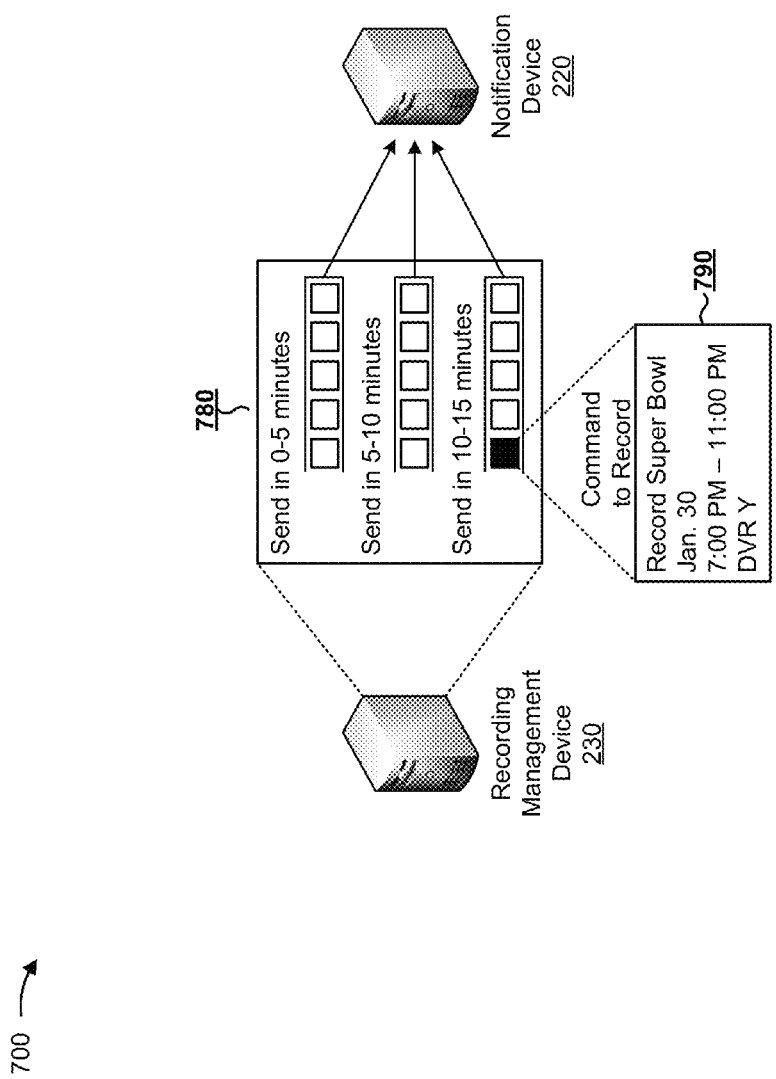

As shown in FIG. 7E, and by reference number 780, recording management device 230 creates queues of instructions to send to notification device 220.

As shown by reference number 790, assume that each instruction contains a DVR identifier (e.g., DVR Y) and a media content identifier that may include the title (e.g., the Super Bowl), the date (e.g., January 30), the start time (e.g., 7:00 p.m.), and the end time (e.g., 11:00 p.m.). Furthermore, assume that the queues are associated with time periods during which to send the instructions to notification device 220. For example, there may be a queue to send instructions during the next five minutes, a queue to send instructions between five to ten minutes, and a queue to send instructions between ten and 15 minutes. Recording management device 230 places a new instruction to record in a queue where the quantity of instructions satisfies (e.g., is less than) a threshold. For example, as shown, assume a given scenario where the threshold is five, both the first queue and the second queue already have five instructions to send, and the third queue only has four instructions to send. In the given scenario, recording management device 230 may add the instruction to the third queue because the third queue satisfies the threshold. Recording management device 230 sends the instructions in a queue to notification device 220 during the time period associated with the queue.

As indicated above, FIGS. 7A-7E are provided merely as an example. Other examples are possible and may differ from what was described with regard to FIGS. 7A-7E.

Figure 8:
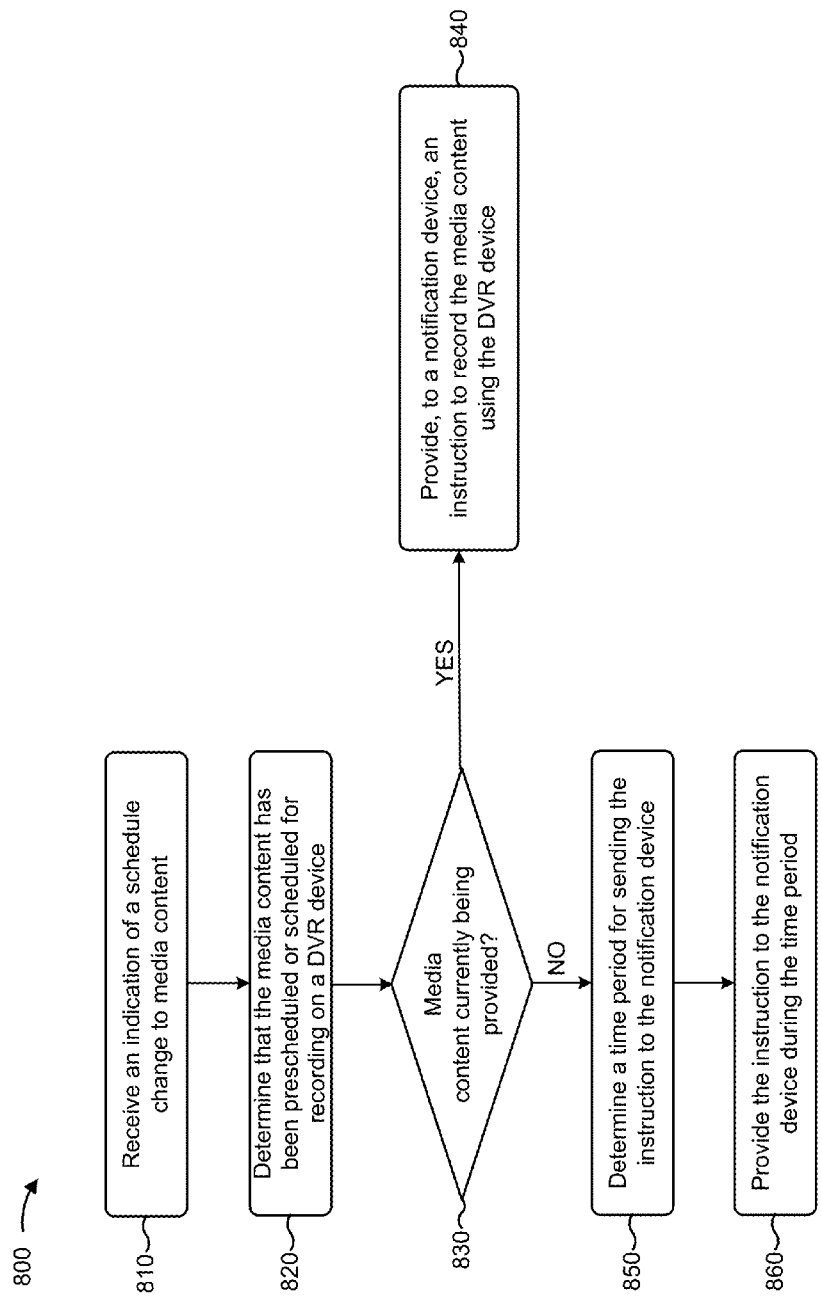
FIG. 8 is a flow chart of an example process for managing a scheduling change for media content with regard to recording the media content.

FIG. 8 is a flow chart of an example process 800 for managing a scheduling change for media content with regard to recording the media content. In some implementations, one or more process blocks of FIG. 8 may be performed by recording management device 230. In some implementations, one or more process blocks of FIG. 8 may be performed by another device or a set of devices separate from or including recording management device 230, such as DVR device 210, notification device 220, set-top box 240, and/or user device 250.

As shown in FIG. 8, process 800 may include receiving an indication of a schedule change to media content (block 810). For example, recording management device 230 may receive an indication of a schedule change to media content when either the start time or the end time of an item or items of media content are changed. For example, Car Chase was originally scheduled to broadcast on Monday night, but was moved to Tuesday night to accommodate a presidential address.

In some implementations, recording management device 230 may receive the indication of the schedule change as input from an operator. Additionally, or alternatively, recording management device 230 may receive the indication of the schedule change from another device.

When a scheduled start time of media content changes, recording management device 230 may have to send notifications to notification device 220 for all DVR devices 210 that have been scheduled to record the media content, which may result in a large volume of traffic. Implementations described herein assist with alleviating network congestion and processor resources due to this large volume of network traffic.

As further shown in FIG. 8, process 800 may include determining that the media content has been prescheduled or scheduled for a recording on a DVR device (block 820). For example, recording management device 230 may determine that the media content has already been prescheduled or scheduled for recording on DVR device 210. In some implementations, prescheduled for recording, as described herein, may refer to instructions to record that were sent to notification device 220 without a request from the user (e.g., via set-top box 240 or user device 250). Additionally, or alternatively, scheduled for recording may refer to instructions to record that were sent as a result of a user request to record (e.g., via set-top box 240 or user device 250).

In some implementations, recording management device 230 may compare the media content identifier of the media content associated with the schedule changes to the media content identifiers stored by recording management device 230 to determine whether the media content has been scheduled or prescheduled for recording by a DVR device 210. For example, recording management device 230 may determine that DVR B has been prescheduled to record Car Chase and that DVR N has been scheduled to record Car Chase.

As further shown in FIG. 8, process 800 may include determining whether the media content is currently being provided (block 830). For example, recording management device 230 may determine whether the media content is being provided in a similar matter as described above in connection with FIG. 6 (e.g., block 640).

As further shown in FIG. 8, if the media is currently being provided (block 830—YES), then process 800 may include providing, to a notification device, an instruction to record the media content using the DVR device (block 840). For example, when recording management device 230 determines that the media is currently being provided, recording management device 230 may provide, to notification device 220, an instruction to record the media content using DVR device 210 in a similar manner as described above in connection with FIG. 6 (e.g., block 650). For example, when there is a schedule change to an item of media content that is currently being provided (e.g., the Super Bowl goes into overtime), recording management device 230 may immediately send, to notification device 220, the instruction to record. Recording management device 230 may send the instruction immediately, so that the users have a complete recording of the item of media content without any gaps or loss of content.

As further shown in FIG. 8, if the media content is not currently being provided (block 830—NO), then process 800 may include determining a time period for sending the instruction to the notification device (block 850). For example, when recording management device 230 determines that the media is not currently being provided, recording management device 230 may determine a time period for sending the instruction to notification device 220 in a similar manner as described above in connection with FIG. 6 (e.g., block 660).

As further shown in FIG. 8, process 800 may include providing the instruction to the notification device during the time period (block 860). For example, recording management device 230 may send, to notification device 220, the notification to record during the time period determined by recording management device 230 in a similar manner as described above in connection with FIG. 6 (e.g., block 670).

When there is a schedule change to an item of media content that many users may be scheduled or prescheduled to record, there may be a large volume of instructions to record that are generated at the same time. Recording management device 230 may help manage the large volume of instructions by sending the instructions to record over different time periods, instead of all at the same time, thereby reducing the chance of losing instructions or the chance of a delay in recording.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Figure 9A:
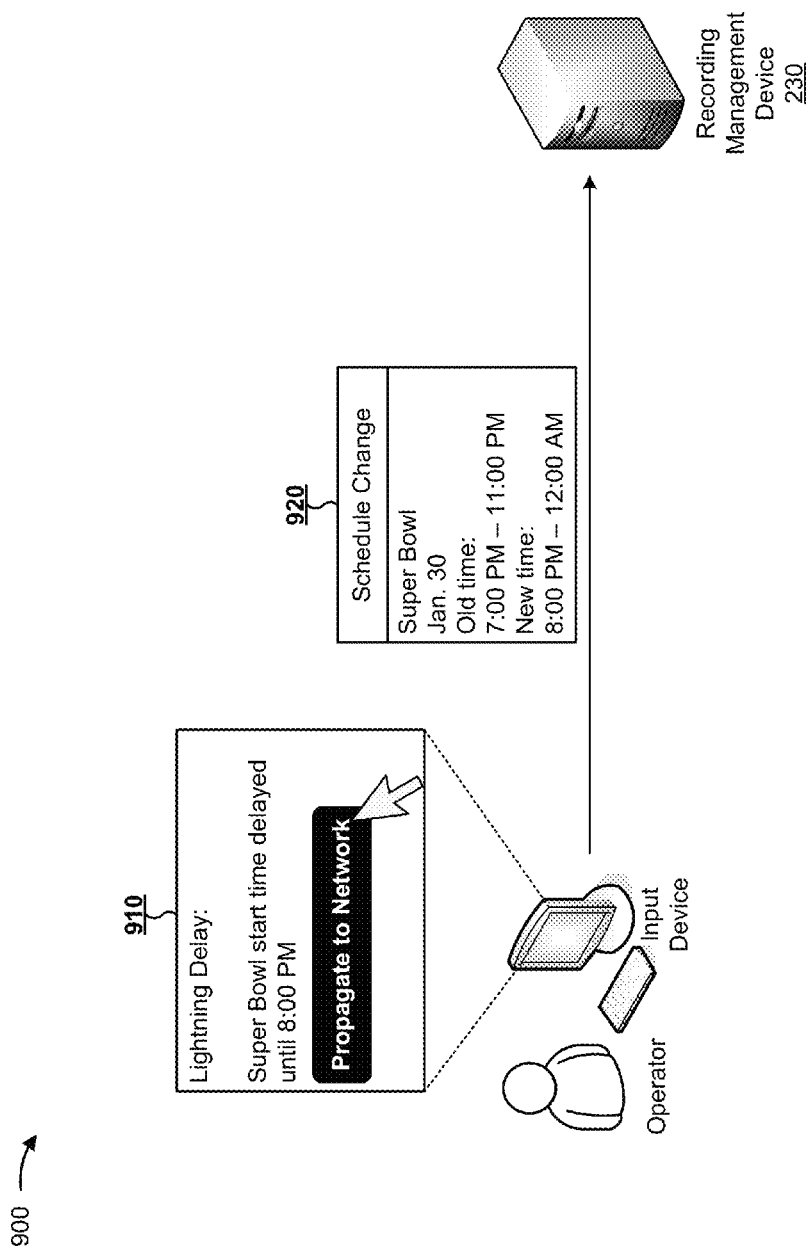
FIGS. 9A-9C are diagrams of an example implementation relating to the example process shown in FIG. 8.
Figure 9B:
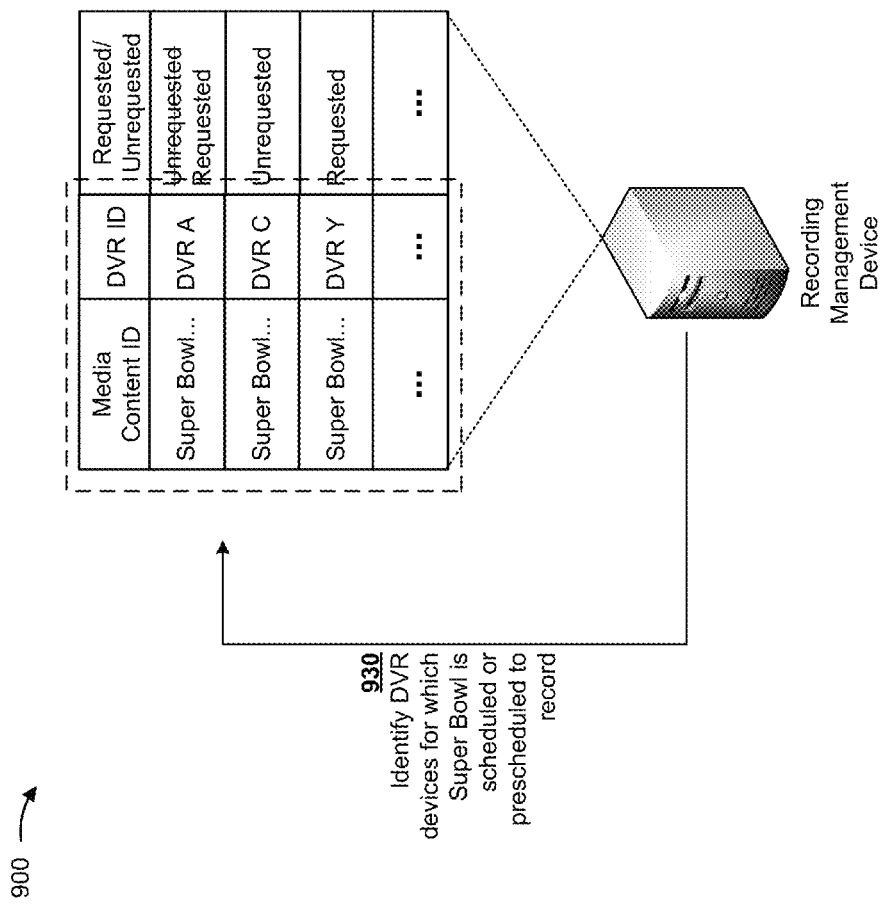
Figure 9C:
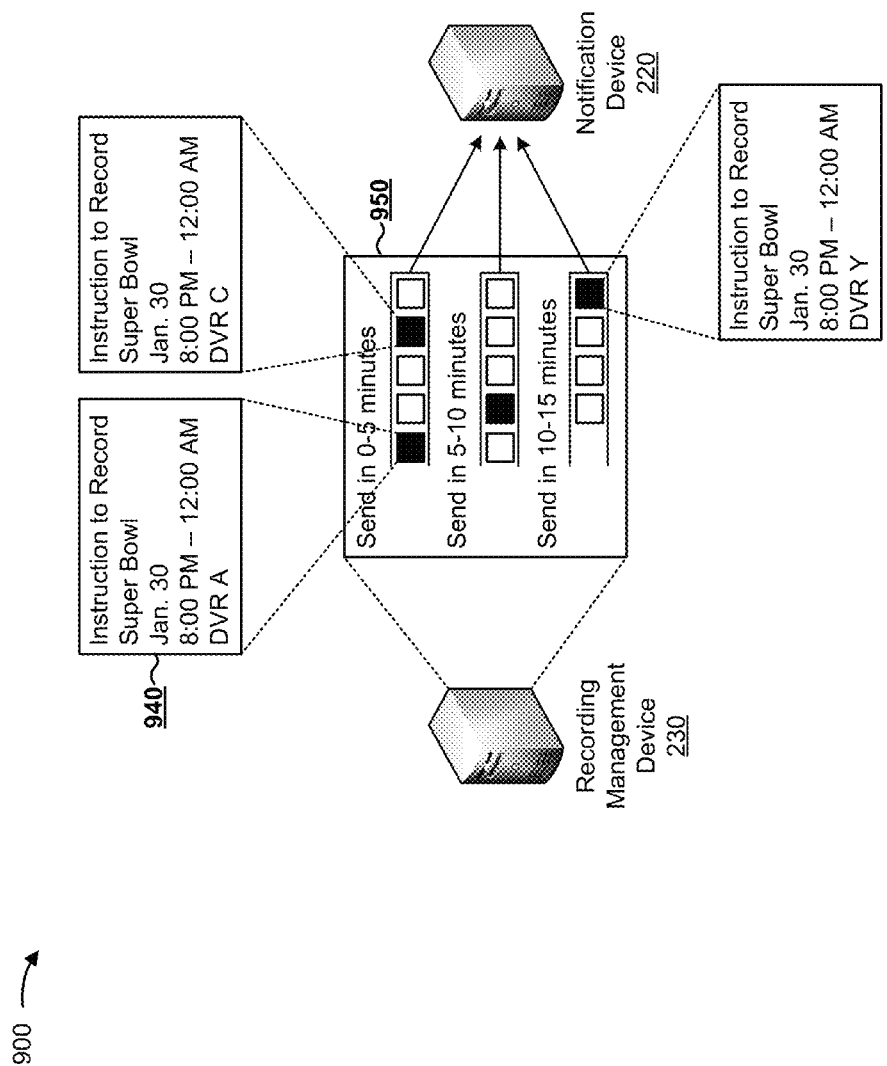

FIGS. 9A-9C are diagrams of an example implementation 900 relating to example process 800 shown in FIG. 8. FIGS. 9A-9C show an example of managing a scheduling change for media content with regard to recording the media content.

As shown in FIG. 9A, and by reference number 910, assume that an operator enters a schedule change to media content. For example, assume that the Super Bowl is delayed because of lightning and that the operator provides an indication of the delay using the input device. As shown by reference number 920, assume that information regarding the schedule change is sent to recording management device 230. For example, the information regarding the schedule change may include the media content identifier (e.g., the Super Bowl), a media content date (e.g., January 30), an old start time and end time (e.g., 7:00 p.m. to 11:00 p.m.) and a new start time and end time (e.g., 8:00 p.m. to 12:00 a.m.).

As shown in FIG. 9B, and by reference number 930, recording management device 230 may use the media content identifier to identify DVR devices 210 for which the media content is scheduled or prescheduled to record. For example, recording management device 230 may determine that the Super Bowl is scheduled or prescheduled to record for DVR A, DVR C, and DVR Y.

As shown in FIG. 9C, and by reference number 940, recording management device 230 may create new instructions to record that reflect the schedule change. For example, a new instruction to record the Super Bowl may be generated for DVR A, DVR C, and DVR Y that indicates a start time of 8:00 p.m. and an end time of 12:00 a.m. As shown by reference number 950, the new instructions to record may be placed in one of multiple queues to send the instructions, to notification device 220, at different time periods. For example, the instruction to record the Super Bowl on DVR A and the instruction to record the Super Bowl on DVR C may be placed in a first queue (e.g., to send the instructions in the next zero to five minutes), and the instruction to record the Super Bowl on DVR Y may be placed in the third queue (e.g., to send the instruction in the next ten to fifteen minutes). Placing the instructions to record in different queues may help manage traffic on network 260 so that all the instructions to record are not sent to notification device 220 at the same time. Sending the instructions at different times may decrease the chance that an instruction is lost or delayed. Sending the instructions at different times may also help reduce congestion on network 260 and save processor and/or memory resources of recording management device 230 and/or other devices.

As indicated above, FIGS. 9A-9C are provided merely as an example. Other examples are possible and may differ from what was described with regard to FIGS. 9A-9C.

Implementations described herein may assist in managing requests to record media content. In some instances, many users may provide requests to record media content (e.g., the Super Bowl) at or around the same time. In these instances, the volume of requests may be burdensome to the network or the system, and may prevent a recording from occurring or may delay a recording. Implementations described above may assist with more effectively managing requests to record media content without overburdening the system, and may help ensure that recordings are not delayed or lost.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device comprising:
one or more processors to:
   determine, without receiving a user request to record media content and based on a quantity of users expected to record the media content, that the media content is to be prescheduled for recording;
   determine a digital video recorder (DVR) device, for which the media content is to be prescheduled for recording, without receiving the user request to record the media content;
   generate a notification indicating that the media content is to be prescheduled for recording;
   mark the notification as unrequested;
   provide, based on the notification, a first instruction to cause the DVR device to schedule recording of the media content,
      a second instruction, to prevent a listing of the recording of the media content from being provided for display, being provided based on the notification being marked as unrequested;
   receive the user request to record the media content; and
   modify, based on receiving the user request to record the media content, the notification to indicate that the media content has been requested for recording.

2. The device of claim 1, where the one or more processors are further to:
   receive information that identifies a quantity of recordings scheduled for the media content; and
   determine that the quantity satisfies a threshold; and
   where the one or more processors, when determining that the media content is to be prescheduled for recording, are to:
      determine that the media content is to be prescheduled for recording based on determining that the quantity satisfies the threshold.

3. The device of claim 1, where the one or more processors are further to:
   receive user profile information associated with a user; and
   determine, based on the user profile information and the media content, that the media content is to be recorded for the user; and
   where the one or more processors, when determining the DVR device, are to:
      determine the DVR device based on determining that the media content is to be recorded for the user, the DVR device being associated with the user.

4. The device of claim 1, where the one or more processors are further to:
   receive user input to record other media content using the DVR device,
      the other media content being different from the media content;
   determine that the other media content has not been prescheduled for recording using the DVR device;
   determine that the other media content is currently being provided or is scheduled to be provided within a threshold amount of time; and
   provide another instruction to cause the DVR device to record the other media content based on determining the other media content is currently being provided or is scheduled to be provided within the threshold amount of time.

5. The device of claim 1, where the one or more processors are further to:
   receive user input to record other media content using the DVR device,
      the other media content being different from the media content;
   determine that the other media content has not been prescheduled for recording using the DVR device;
   determine that the other media content is not currently being provided and is not scheduled to be provided within a threshold amount of time;
   determine a time period for sending another instruction to cause the DVR device to record the other media content; and
   provide the other instruction, during the time period, to cause the DVR device to record the other media content.

6. The device of claim 1, where the one or more processors are further to:
   send, after the media content has been provided, a delete command to cause the DVR device to delete the media content, based on the notification and after a threshold amount of time.

7. The device of claim 1, where listing of the recording of the media content being permitted to be provided, for display, based on receiving the user request.

8. A computer-readable medium storing instructions, the instructions comprising:
   one or more instructions that, when executed by one or more processors, cause the one or more processors to:
      determine a quantity of users expected to record media content;
      determine, based on the quantity of users expected to record the media content, that the media content is to be prescheduled to record without receiving input, from a user associated with a digital video recorder (DVR) device, to record the media content;
      identify the DVR device, for which the media content is to be prescheduled to record, without receiving the input from the user;
      store an indication that the media content is prescheduled to be record and that the input has not been received;
      output a first command to cause the DVR device to schedule recording of the media content based on identifying the media content and identifying the DVR device,
         a second command, to prevent a listing of the recording of the media content from being provided for display, being outputted based on the indication;
      receive the input; and modify, based on receiving the input, the indication to indicate that the media content has been requested for recording.

9. The computer-readable medium of claim 8, where the one or more instructions, when executed by the one or more processors, further cause the one or more processors to:
create a notification associated with the DVR device and the media content; and
store the notification.

10. The computer-readable medium of claim 8, where the one or more instructions, when executed by the one or more processors, further cause the one or more processors to:
receive operator input that identifies the media content to be prescheduled to record; and
where the one or more instructions, that cause the one or more processors to determine that the media content is to be prescheduled for recording, cause the one or more processors to:
determine that the media content is to be prescheduled for recording based on the operator input.

11. The computer-readable medium of claim 8, where the one or more instructions, when executed by the one or more processors, further cause the one or more processors to:
receive user profile information associated with the user,
the user profile information being information about the user or a class of users determined to be similar to the user; and
determine, based on the media content and the user profile information, that the media content is to be recorded for the user; and
where the one or more instructions, that cause the one or more processors to identify the DVR device, cause the one or more processors to:
identify the DVR device based on identifying that the media content is to be recorded for the user,
the DVR device being associated with the user.

12. The computer-readable medium of claim 8, where the one or more instructions, when executed by the one or more processors, further cause the one or more processors to:
receive a request from the user to record other media content using the DVR device,
the other media content being different from the media content;
determine that the other media content has not been prescheduled to record using the DVR device;
determine that the other media content is not currently being provided and is not scheduled to be provided within a threshold amount of time;
identify a queue, associated with a time period for sending another command to cause the DVR device to record the other media content, based on determining that the other media content is not currently being provided and is not scheduled to be provided within the threshold amount of time;
place the other command in the queue; and
send the other command based on placing the other command in the queue.

13. The computer-readable medium of claim 12, where the one or more instructions, when executed by the one or more processors, further cause the one or more processors to:
determine a quantity of commands in the queue;
determine a threshold associated with placing commands in the queue; and
determine that the quantity satisfies the threshold; and
where the one or more instructions, that cause the one or more processors to identify the queue, cause the one or more processors to:
identify the queue based on determining that the quantity satisfies the threshold.

14. The computer-readable medium of claim 8, where the indication is a first indication; and
where the one or more instructions, when executed by the one or more processors, further cause the one or more processors to:
receive a second indication indicating a schedule change to the media content;
determine whether the media content is currently being provided; and
provide an instruction to record the media content according to the schedule change based on determining that the media content is currently being provided.

15. A method comprising:
identifying, by a device, media content to be prescheduled to record without receiving a request, from a user, to record the media content and based on a quantity of users expected to record the media content;
determining, by the device, a digital video recorder (DVR) device, for which the media content is to be prescheduled to record without receiving the request to record from the user,
the DVR device being associated with the user;
storing, by the device, an indication that the media content is prescheduled to be recorded and that the request to record the media content has not been received;
sending, by the device, a first command to cause the DVR device to scheduling recording of the media content based on identifying the media content and determining the DVR device,
a second command, to delete the recording of the media content, being sent based on the indication after a threshold period of time;
receiving, by the device, the request to record the media content; and
modifying, by the device and based on receiving the request to record the media content, the indication to indicate that the media content has been requested for recording.

16. The method of claim 15, further comprising:
creating a prescheduling notification associated with the DVR device and the media content; and
storing the prescheduling notification.

17. The method of claim 16, further comprising:
sending, after the media content has been provided, a delete command to cause the DVR device to delete the media content, based on the prescheduling notification and the indication.

18. The method of claim 15, further comprising:
receiving an indication of a schedule change to the media content;
determining that the media content has been prescheduled or scheduled to record using the DVR device;
determining that the media content is not currently being provided and is not scheduled to be provided within a threshold amount of time;
identifying a time period for sending another command to cause the DVR device to record the media content, based on determining that the media content is not currently being provided and is not scheduled to be provided within the threshold amount of time; and
providing the other command during the time period.

19. The method of claim 15, further comprising:
receiving historical information associated with the media content;
identifying the quantity of users expected to record the media content based on the historical information; and
determining that the quantity satisfies a threshold; and
where identifying the media content comprises:
   identifying the media content based on determining that the quantity satisfies the threshold.

20. The method of claim 19, where receiving the historical information comprises at least one of:
receiving information that identifies a first quantity of users who previously played the media content at a time the media content was provided,
receiving information that identifies a second quantity of users who previously played related media content, related to the media content, at a time the related media content was provided,
receiving information that identifies a third quantity of users who recorded the media content or the related media content, or
receiving information that identifies a fourth quantity of users who played the media content or the related media content from a recording.

* * * * *